United States Patent [19]

Takato et al.

[11] Patent Number: 4,935,960

[45] Date of Patent: Jun. 19, 1990

[54] BATTERY FEED CIRCUIT

[75] Inventors: Kenji Takato; Toshiro Tojo; Kazumi Kinoshita; Yuzo Yamamoto, all of Kawasaki, Japan

[73] Assignee: Fujitsu Limited, Kawasaki, Japan

[21] Appl. No.: 409,701

[22] Filed: Sep. 20, 1989

Related U.S. Application Data

[63] Continuation of Ser. No. 207,512, Jun. 16, 1989, abandoned.

[30] Foreign Application Priority Data

| Jun. 17, 1987 | [JP] | Japan | 62-149264 |
| Jun. 17, 1987 | [JP] | Japan | 62-149265 |
| Jun. 17, 1987 | [JP] | Japan | 62-149266 |
| Jun. 17, 1987 | [JP] | Japan | 62-149268 |
| Sep. 18, 1987 | [JP] | Japan | 62-232489 |
| Dec. 15, 1987 | [JP] | Japan | 62-315261 |

[51] Int. Cl.$^5$ ............................................. H04M 19/00
[52] U.S. Cl. .................................. 379/413; 379/399; 379/324; 379/405
[58] Field of Search ............... 379/413, 405, 399, 324

[56] References Cited

U.S. PATENT DOCUMENTS

| 4,387,273 | 6/1983 | Chea, Jr. | 307/398 |
| 4,476,350 | 10/1984 | Aull et al. | 379/413 X |
| 4,709,388 | 11/1987 | Defretin | 379/413 |

FOREIGN PATENT DOCUMENTS

| 57-42263 | 3/1982 | Japan . |
| 61-62268 | 3/1986 | Japan . |
| 0283263 | 12/1986 | Japan | 379/406 |

OTHER PUBLICATIONS

IEEE Journal of Solid-State Circuits, vol. SC-16, No. 4, Aug. 1981.

*Primary Examiner*—James L. Dwyer
*Attorney, Agent, or Firm*—Staas & Halsey

[57] ABSTRACT

A battery feed circuit including a main battery feed part and its peripheral circuits provided in a line circuit of a switching system. The peripheral circuits include the following: First, a means for forming a low impedance with respect to in-phase signals, simply realized by a capacitor; second, a bias circuit able to suppress the entry of power source noise and easily switch magnitudes of bias voltages and polarities, realized by a bias voltage generating means, a buffer means, and and AC bypass capacitor; third, a battery feed current control circuit able to suppress overflow of battery feed current when the distance to the subscriber is short, which detects an overcurrent component above a predetermined value, and, in accordance with the same, changes the bias voltage; fourth, a battery feed current supervising circuit able to detect current in both the forward and reverse directions, realized by an emitter-follower pair and a voltage/current converting resistor; fifth, a circuit for detecting bidirectional battery feed currents at a high precision, which is formed by forward direction and reverse direction current detection means provided with $V_{BE}$ cancelling means; and sixth, an overcurrent protection circuit, which changes the voltage applied between the inputs $(+,-)$ of a transconductance amplifier forming the main battery feed part in accordance with an excess voltage.

28 Claims, 7 Drawing Sheets

(1)

(2)

(3)

(4)

(5)

BATTERY FEED CIRCUIT

This is a continuation of co-pending application Ser. No. 207,512 filed June 16, 1989, now abandoned.

BACKGROUND OF THE INVENTION

1. Field of the Invention

The present invention relates to a battery feed circuit, more particularly to a batter feed circuit above to be provided in a switching system line circuit.

In general, battery feed circuits are placed at the switching system side for the principal purpose of supplying DC current through subscriber lines (line A and line B) to the subscriber telephone terminal equipment to operate the same. These battery feed circuits are connected to the terminals of the line A and line B forming the above subscriber lines, so they must be designed so that the input impedance with respect to the AC signal seen from the line A and line B becomes a predetermined value. This input impedance is divided into two types ($Z_{DT}$, $Z_{CT}$) and must satisfy the following conditions:

[1] A high AC impedance $Z_{DT}$ with respect to a differential signal (voice signal),

[2] A low AC terminating impedance $Z_{CT}$ with respect to the in-phase signal (AC induction and other undesired AC signals),

[3] A value of the DC battery feed resistor able to supply the DC current required by the telephone, for example, several hundred ohms.

The AC terminating impedance $Z_{DT}$ with respect to the differential signal is preferably a high one so as to prevent attenuation of the same. On the other hand, the AC terminating impedance $Z_{CT}$ with respect to the above in-phase signal is preferably a low one to cause extreme attenuation of the same. Further, in recent years, the conditions for in-phase signals have become severer and a demand has arisen for prevention of distortion in the voice signals even when the in-phase signal current becomes larger than the DC battery feed current.

2. Description of the Related Art

As related art, mention may be made of Japanese Unexamined Patent Publication (Kokai) No. 57-42263. This satisfies the above conditions [2] and [2], but cannot deal with the above-mentioned recent trends, i.e., the demands for prevention of distortion in voice signals even when the in-phase signal current becomes larger than the DC battery feed current. The reasons for this is that the battery feed circuit shown in the publication is comprised of a PNP transistor with a collector connected to line B and an NPN transistor with a collector connected to line A, the former PNP transistor only transmits a DC current from its collector, and the latter NPN transistor only absorbs the DC current from its collector, i.e., conductance of the DC current in the reverse direction is not possible.

Therefore, a battery feed circuit which can not only handle DC current to line A and line B in the forward direction, but also handle DC current in the reverse direction has become necessary in practice. That is, a bidirectional battery feed circuit has become necessary. This bidirectional battery feed circuit will become needed more and more in the market in the future.

Various methods are conceivable for realizing a battery feed circuit. As one example, there has been proposed a bidirectional battery feed circuit using a transconductance amplifier. This is shown as FIG. 2 on page 262 of the IEEE JOURNAL OF SOLID-STATE CIRCUITS, VOL. SC-16, NO. 4, AUGUST 1981 (details given later). However, battery feed circuits share peripheral circuits (for example, bias circuits) and function in the line circuit, so even if a bidirectional battery feed circuit per se could be realized, it would have no practical significance.

SUMMARY OF THE INVENTION

Therefore, the present invention has as its object the provision of a bidirectional battery feed circuit which has significance when incorporated in an actual line circuit.

To achieve the above-mentioned object, the present invention provides a bidirectional battery feed circuit with compatible peripheral circuits, specifically a low impedance (with respect to the in-phase signal) forming means, a bias circuit, a battery feed current control circuit, a battery feed current supervising circuit, a battery feed current detection circuit, and a protection circuit for when the battery feed current becomes overcurrent.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

As mentioned above, the present invention provides specific proposals on the peripheral circuits shared by a bidirectional battery feed circuit. In this case, the bidirectional battery feed circuit itself may be thought to be realizable by various means, but with the peripheral circuits referred to in the present invention, the bidirectional battery feed circuit itself may be freely designed in structure and is not particularly limited. Therefore, the bidirectional battery feed circuit disclosed in the publication is introduced merely as an example.

Figure 1:
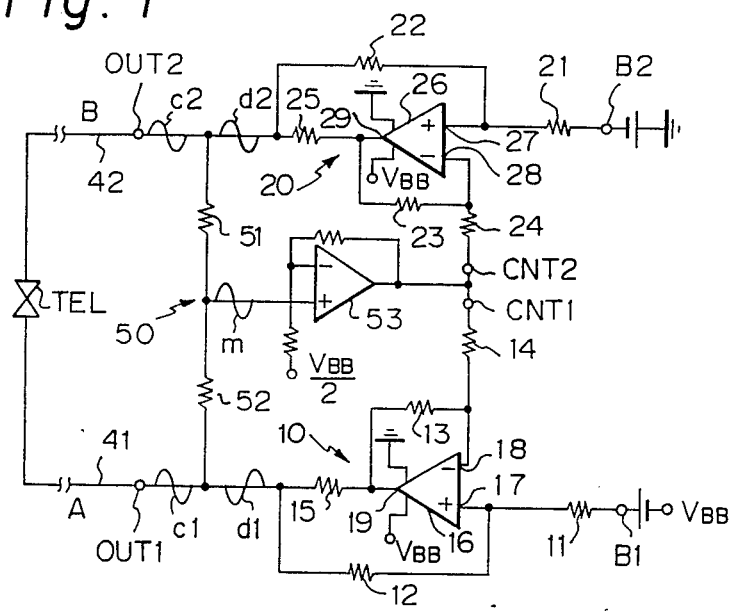
FIG. 1 is a circuit diagram of the bidirectional battery feed circuit introduced in the publication.

FIG. 1 is a circuit diagram of the bidirectional battery feed circuit introduced in the publication. In the figure, the battery feed circuit is comprised of a first transconductance amplifier 10, a second transconductance amplifier 20, and a feedback control circuit 50 and supplies DC current to the so-called line A 41 and line B 42 linked with the subscriber telephones TEL through battery feed terminals OUT1 and OUT2. The first and second transconductance amplifiers 10 and 20 have the same construction and are comprised of operational amplifiers 16 and 26 and various resistor groups. Further, they are provided with bias input terminals B1 and B2, control input terminals CNT1 and CNT2, and the above-mentioned battery feed terminals OUT1 and OUT2. Note that the above-mentioned resistors include first to fifth resistors (11 to 15) for the first transconductance amplifier 10 and first to fifth resistors (21 to 25) for the second transconductance amplifiers 20.

Figure 2:
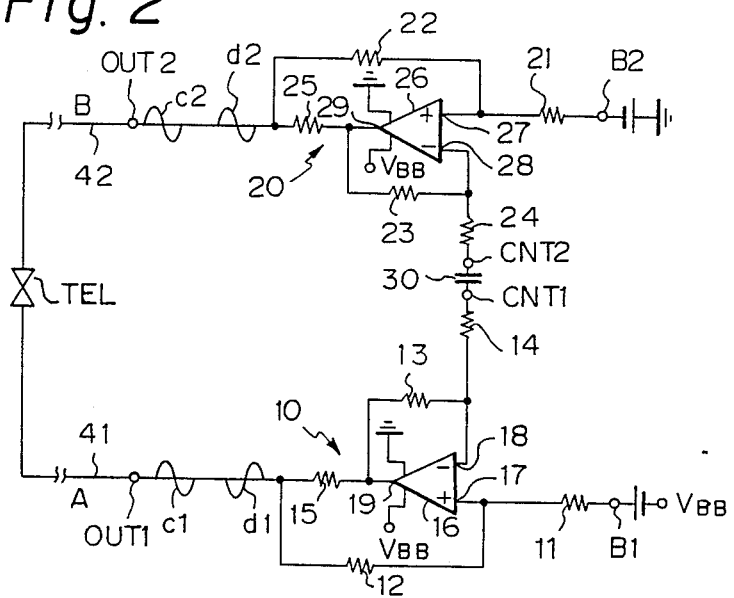
FIG. 2 is a view showing the basic structure of a battery feed circuit provided with a low impedance forming means according to the present invention.
Figure 3:
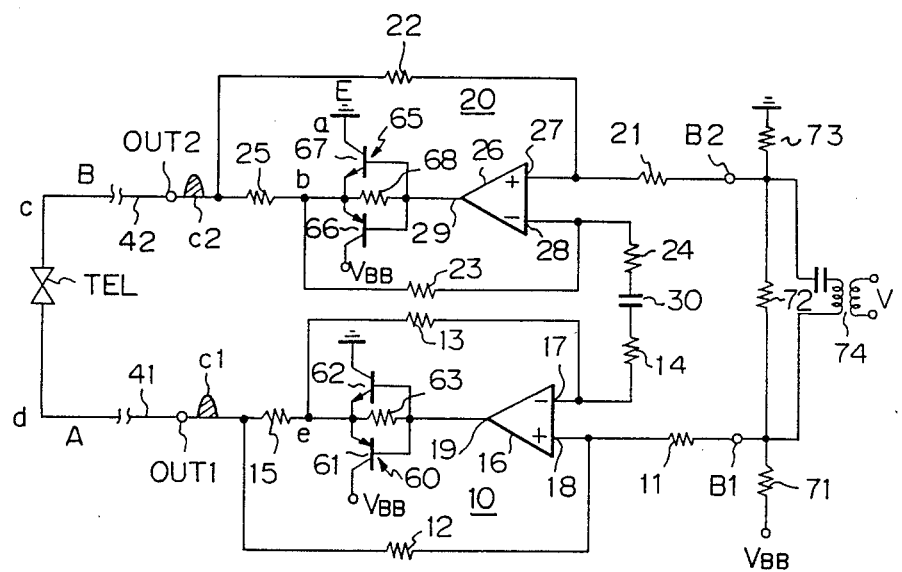
FIG. 3 is a view showing an embodiment of a battery feed circuit provided with a low impedance forming means according to the present invention.

The battery feed circuit shown in FIG. 1 is shown in FIG. 2 of page 262 of the publication IEEE JOURNAL OF SOLID-STATE CIRCUITS, VOL. SC-16, NO. 4, AUGUST 1981 and is provided with, as basic elements, a pair of transconductance amplifiers (10 and 20) and a feedback control circuit (50). The transconductance amplifiers are shown in FIG. 3 of the same page of the publication and are equivalent in function to a constant current source. Therefore, they satisfy the above-mentioned condition [1] (high impedance with respect to differential signal) and condition [3] predetermined DC battery feed resistance). However, the above-mentioned condition [2] (low impedance with respect to in-phase signal) cannot be satisfied with the transconductance amplifiers alone. Therefore, to obtain a low impedance with respect to the in-phase signals, the practice has been to introduce the feedback control circuit 50 and to apply its output to the already mentioned control input terminals CNT1 and CNT2 (FIG. 1).

In the already mentioned conventional example (Japanese Unexamined Patent Publication (Kokai) No. 57-42263), the PNP transistor could only transmit the DC current and the NPN transistor could only absorb the DC current, i.e., the circuit was not a bidirectional battery feed circuit. However, the operational amplifiers (16 and 26) inherently can both transmit current from their outputs and absorb the same, so it does not matter if the in-phase signal current becomes larger than the DC battery feed current.

In the battery feed circuit of FIG. 1, the feedback control circuit 50 is introduced and, first, the middle point voltage between the line A 41 and line B 42 is detected by the resistors 51 and 52. The differential signal appears as the waveforms d1 and d2 in FIG. 1, so the differential signal component is not detected as the middle point voltage. However, the in-phase signal appears as the waveforms c1 and c2 in the figure, so the middle point voltage is detected as the waveform m. The middle point voltage m is applied to the non-inverting input of a non-inverting amplifier 53 which takes $V_{BB}/2$ ($V_{BB}$ is the power source voltage for the amplifiers 16 and 26) as its inverting input. The output is applied to the control input terminals CNT1 and CNT2. By this, the in-phase signal current, which is the external AC induction, can be alternately absorbed in the transconductance amplifiers 16 and 26.

As mentioned above, the battery feed circuit (FIG. 1) requires a large sized feedback control circuit 50 comprised of middle point voltage detection resistors 51 and 52 and a non-inverting amplifier 53, so there is the problem that that circuit becomes large in size and complicated.

The present invention was made in consideration of these problems and provides a bidirectional battery feed circuit which substantially does not require a feedback control circuit. That is, it provides an extremely simple circuit as a low impedance (with respect to the in-phase signal) forming means.

FIG. 2 is a view showing the basic structure of a battery feed circuit provided with a low impedance forming means according to the present invention. In the figure, the above-mentioned feedback control circuit (50 in FIG. 1) is eliminated and, in its place, a capacitor 30 coupling a control input terminal CNT1 and control input terminal CNT2 is provided.

In operation, briefly speaking, the situation is equivalent to one where the capacitor 30 is nonexistent as seen with respect to the in-phase signals, so the desired low impedance with respect to the in-phase signals is realized. Further, the state is the same in the case as seen with respect to the DC battery feed current. On the other hand, with respect to the differential signals, the capacitor 30 seems to be divided in two and its middle point is equivalent to being connected to the virtual earth, so the desired high impedance is achieved with respect to the differential signals.

Therefore, just a single capacitor is provided and it becomes possible to eliminate the above-mentioned complicated feedback control circuit 50 and $V_{BB}/2$ power source (details on operational principle will follow).

FIG. 3 is a view showing one embodiment of a battery feed circuit provided with a low impedance forming means according to the present invention. Basically, it has the same circuit structure as that in FIG. 2, but the operational amplifiers 16 and 26 are provided at their outputs 19 and 29 with buffer circuits 60 and 65 comprising emitter followers. Note that a corresponding buffer circuit has been disclosed in, for example, U.S. Pat. No. 4387273. By this, even if in-phase signals considerably larger than the battery feed current intrude, they can be sufficiently processed. Further, the bias input terminals B1 and B2 have applied thereto predetermined voltages divided by the three voltage dividing resistors 71, 72, and 73. Note that the input/output part of the voice signals V can be suitably selected, but this figure shows an example where a transformer 74 is provided at the illustrated position and this used for input and output of the voice signals V.

Looking at the above-mentioned buffer circuits 60 and 65, the former is comprised of PNP transistor 61 and NPN transistor 62 (both emitter coupled transistors) and a resistor 63, while the latter buffer circuit 65 is comprised of the PNP transistor 66, the NPN transistor 67 (both emitter coupled transistors), and the resistor 68. In-phase signals c1 and c2 larger than the DC battery feed current at one instant are shown in hatching in the figure. c1 is absorbed by the PNP transistor 61 and c2 by the PNP transistor 66. At the next instant, the polarities of the in-phase signals c1 and c2 are switched, whereupon next a current corresponding to c2 flows in from the NPN transistor 62 and a current corresponding to c2 flows in from the NPN transistor 67. Note that the original DC battery feed current continuously flows by the route, in the figure, from the earth E (0 V) to a→b→c→d→e→$V_{BB}$ (−48 V).

Figure 4:
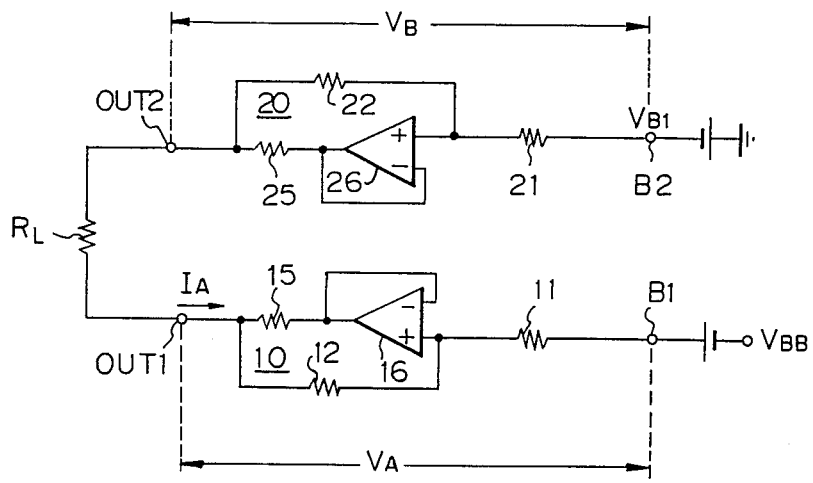
FIG. 4 is a DC equivalent circuit of the battery feed circuit shown in FIG. 2.

Next, the operational principle of the battery feed circuit having the low impedance forming means of FIG. 2 will be explained with reference to FIG. 4, FIG. 5, and FIG. 6. FIG. 4 is a DC equivalent circuit of the battery feed circuit shown in FIG. 2 and shows that a desired DC battery feed resistance is obtained. Note that the resistances R of the resistors are set in advance so that the relationship of $R_{15} << R_{12}, R_{11}$ (suffixes 11, 12, and 15 show that resistances are for resistors 11, 12, and 15, same below) is satisfied. For the DC battery feed, the capacitor 30 (FIG. 2) substantially does not exist. The nonexistence of the capacitor 30 means the same thing as nonexistence of the resistors 14 and 24 (FIG. 2). Here, looking at the first transconductance amplifier 10 side, the DC current $I_A$ flowing in there is expressed by:

$$I_A = [V_A \times R_{12}/(R_{12}+R_{11})] \div R_{15} \quad (1)$$

The reason why the current $I_A$ is expressed by this formula (1) is as follows: In FIG. 2, the capacitor 30 displays an infinitely larger impedance with respect to the DC current, so substantially is nonexistent (OPEN), while the resistor 14 (which is connected to the infinitely large impedance) is in an OPEN state at one end. Therefore, the resistor 14 has no effect at all in the circuit and substantially is nonexistent. For this reason, only the resistor 13 is connected between the output terminal and inverting input terminal of the operational amplifier. The resistor 13 feeds back the output signal as it is to the inverting input terminal, but the input current of the operational amplifier is extremely small, so the voltage drop of the resistor 13 cannot be ignored (at current zero, only the voltage signal is fed back).

Therefore, the value of the resistor 13 may be zero ohms (short-circuit), i.e., it may take the form of a voltage follower. In FIG. 4, when the voltage of $V_A$ is applied to the circuit, the voltage $V_X$ between the OUT1 and the noninverting input become the value divided by $R_{11}$ and $R_{12}$ and $$V_X = R_{12}/(R_{11}+R_{12}) \times V_A.$$

As to the the voltage of the noninverting input, since the output of the potential follower appears as it is, $V_X$ is applied to the two ends of the resistor 15. Now, since $R_{15} << R_{12}, R_{11}$, $$I_A = (V_X/R_{15}) = [R_{12}/(R_{11}+R_{12}) \times V_A] \div R_{15}$$

Here, the DC equivalent resistance $R_A [=V_A/I_A]$, using the above formula (1), becomes $$R_A = V_A/I_A = V_A/[V_A \times R_{12}/(R_{12}+R_{11}) \div R_{15}] = [(R_{11}+R_{12}) \times R_{15}]/R_{12} \quad (2)$$

As clear from formula (2), if the three resistors 11, 12, and 15 are suitably set, the desired resistance $R_A$ (for example, several 100 ohms) can be obtained (satisfying the previously mentioned condition [3]). Further, the precision of the resistance $R_A$ is improved by raising the precision of the resistances of these resistors.

On the other hand, the DC equivalent resistance $R_B$ can be similarly set for the second transconductance amplifier 20 too, as expressed by the following formula:

$$R_B = [(R_{21}+R_{22}) \times R_{25}]/R_{22} \quad (3)$$

Figure 5:
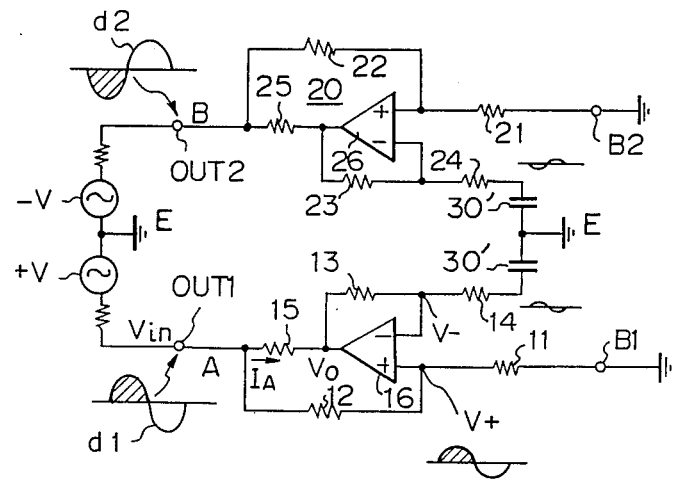
FIG. 5 is a differential signal equivalent circuit of the battery feed circuit shown in FIG. 2.

FIG. 5 is a differential signal equivalent diagram of the battery feed circuit shown in FIG. 2. With respect to the differential signal, the circuit is equivalent to one with two capacitors 30' arranged in series about a virtual earth E for the AC component. The capacity of the capicitors 30', if the capacity of the capacitor 30 in FIG. 2 is $C_{ab}$, is $C_{ab} \times 2$. This equivalent circuit is formed because the differential signals d1 and d2 of line A and line B fluctuate symmetrically up and down in the figure. Here, if $C_{ab}$ is selected to be sufficiently large with respect to the resistances $R_{14}$ and $R_{15}$ of the resistors 14 and 24, i.e., $$R_{14}, R_{24} >> \tfrac{1}{2} \pi f C_{ab} \qquad (4)$$

where, f is the lowest frequency of the differential signal then the voltage applied to the capacitors 30' becomes substantially zero. By using this, first, the voltage of the point shown by V+ in the figure may be expressed by:

$$V+ = V_{in} \times R_{11}/(R_{12}+R_{11}) \qquad (5)$$

where, $V_{in}$ is the voltage appearing at OUT1 but V+ becomes equal to V− by a so-called imaginary short-circuit of the operational amplifier 16, so the voltage V− at the inverting input (−) becomes:

$$V_0-V-)/R_{13}=(V--0)/R_{14} \qquad (6)$$

where, $V_0$ is the voltage of the output of the operational amplifier 16 −0 of the right side numerator expresses that the voltage across the capacitors 30' becomes zero, as mentioned earlier. By this formula (6), we get:

$$V_0=[(R_{13}+R_{14})/R_{14}] \times V- \qquad (7)$$

From this formula (7) and the above-mentioned formula (5) (V+=V−), the current $I_A$ [$=(V_{in}-V_0)/R_{15}$] comes to be expressed by:

$$I_A=V_{in}/R_{15}[(R_{12}+R_{11})/R_{11}-(R_{13}+R_{14})/R_{14}] \qquad (8)$$

Here, if the resistances of the resistors 11, 12, 13, and 14 are set in advance so that $R_{11}+R_{14}$ and $R_{12}=R_{13}$, then $I_A$ of the above-mentioned formula (8) becomes $I_A=0$. $I_A=0$ means that a high impedance with respect to the differential signal is realized (the above-mentioned condition [1] is satisfied).

Figure 6:
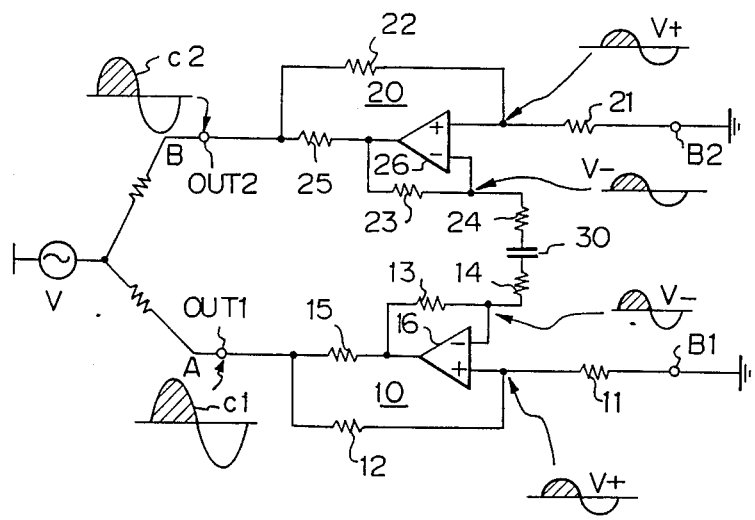
FIG. 6 is an in-phase signal equivalent circuit of the battery feed circuit shown in FIG. 2.

FIG. 6 is an in-phase signal equivalent circuit of the battery feed circuit shown in FIG. 2. When in-phase signals (c1 and c2) enter, the voltage V+ of the noninverting input (+) of the operational amplifier 16 in the first transconductance amplifier 10 and the voltage V− of the inverting input (−) change by the illustrated waveforms. These changes are exactly the same at the side of the second transconductance amplifier 20 as well. This being the case, absolutely no voltage appears across the capacitor 30 with respect to the in-phase signals. That is, with respect to the in-phase signals, the capacitor 30 substantially does not exist. As a result, the in-phase signal equivalent circuit becomes the same as the DC equivalent circuit shown in FIG. 4 and the impedance corresponding to the DC battery feed resistance (for example, several hundred ohms) becomes the impedance with respect to the in-phase signals, whereby a low value can be obtained (satisfying the above-mentioned condition [2]).

As mentioned above, according to the present invention, a bidirectional battery feed circuit provided with a low impedance forming means which is simplified compared with the circuit of FIG. 1 can be realized.

Next, an explanation will be made of the bias circuit, particularly the bias circuit for supplying a bias voltage to the bidirectional main battery feed part provided at the line circuit of the switching system. This battery feed circuit includes an operational amplifier as shown in FIG. 1. A predetermined bias voltage must be applied to the main battery feed part to make the operational amplifier operate normally. The bias circuit supplies this bias voltage.

Figure 7:
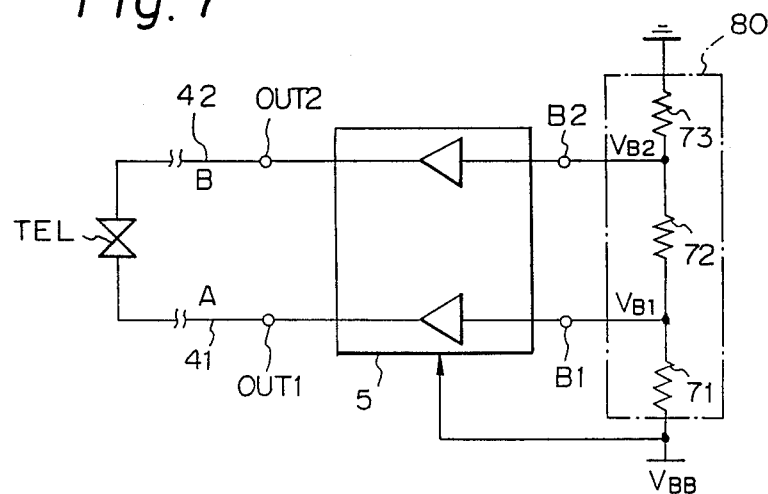
FIG. 7 is a view showing an example of a conventional general bias circuit.

FIG. 7 is a view showing an example of a conventional general bias circuit. The bias circuit 80 in the figure has therein three resistors 71, 72, and 73 (see FIG. 3) and obtains bias voltages $V_{B1}$ and $V_{B2}$ by so-called voltage division. In this case, the voltage which is divided is the power source voltage $V_{BB}$ applied commonly to the main battery feed part 5.

Note that the main battery feed part 5 is provided with bias input terminals B1 and B2 (see FIG. 3) for receiving the supply of the bias voltages $V_{B1}$ and $V_{B2}$ and the battery feed terminals OUT1 and OUT2 (see same figure) for feeding a predetermined direct current and operates the subscriber telephones TEL through the line A 41 and line B 42. The input-output portion (transformer etc.) of the voice signals was shown in FIG. 3, so mention thereof is omitted.

With the general bias circuit 8 shown in FIG. 7, the power source ($V_{BB}$) is directly connected to the bias input terminals B1 and B2, so the noise generated by the power source enters into the main battery feed part as it is and thus causes the problem of deteriorated speech quality. Further, there is the problem that is not easy to freely reset the bias voltage in accordance with need. Still further, there is the problem that it is impossible to perform reverse battery feed. Reverse battery feed means to make the current flow in the opposite direction (A→B) from the usual flow of DC current from line B 42 to line A 41 and is used, for example, in the case of provision of high grade service such as automatic call termination. However, reversal of the direction of the current itself was made possible by the bidirectional battery feed circuit explained earlier.

The second aspect of the present invention was made in consideration of these problems and provides a bias circuit for a bidirectional battery feed circuit free from entry of power source noise into the main battery feed part and enabling easy change of the bias voltage. Note that the operational amplifier in the main battery feed part 5 has an inherent noise elimination ability and no power source noise enters from the same itself.

Figure 8:
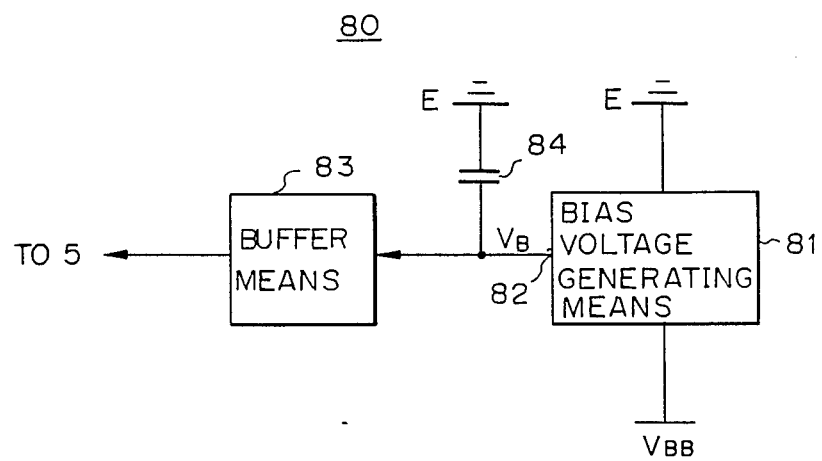
FIG. 8 is a block diagram showing the principle of the bias circuit according to the present invention.

FIG. 8 is a block diagram showing the principle of the bias circuit according to the present invention. The bias circuit 80 in the present invention is comprised of a bias voltage generating means 81 having a high output impedance, a buffer means 83 having a low output impedance which receives the bias voltage $V_B$ generated at the output point 82 and supplies the same to the main battery feed part 5, and an AC bypassing capacitor 84 which is connected between the output point 82 and the earth E. Note that the figure shows the bias circuit connected to one of the line A 41 side or the line B 42 side, but this may be connected to both of the line A 41 side and the line B 42 side.

The operation will be described below. The bias voltage generating means 81 has a high output impedance. That is, the output point 82 becomes a high impedance. The high impedance of the output point 82 is used and a capacitor 24 connected between the output point 82 and the earth E to selectively make just the AC component low impedance. As a result, the noise entering from the power source ($V_{BB}$) is suppressed by the capacitor 84.

On the other hand, a buffer means 83 having a low output impedance is provided so as to return the bias voltage $V_B$ appearing at the output point 82, which become high output impedance, to the low output impedance, and supply the same to the bias input terminals B1 and B2.

Figure 9:
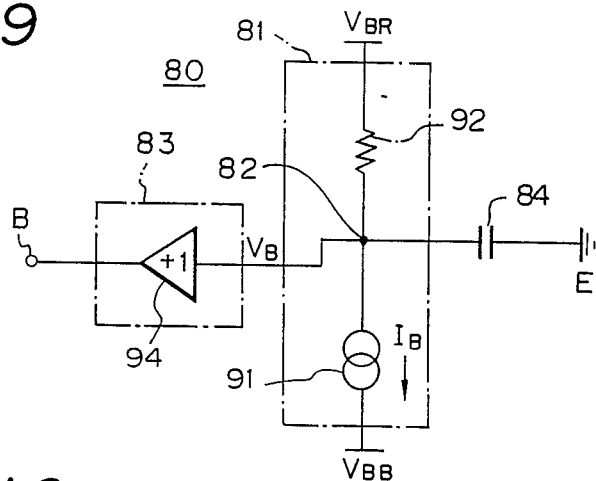
FIG. 9 is a circuit diagram showing an embodiment of the bias circuit according to the present invention.

FIG. 9 is a circuit diagram showing an embodiment of the bias circuit according to the present invention. As shown in the figure, the bias circuit 80 according to this embodiment has the bias voltage generating means 82 having a high output impedance comprised of a current source 91 and a resistor 92 and, with these intermediate connecting points, forms an output point 82. Further, the buffer means 83 having a low output impedance is comprised by a voltage follower circuit 94. The AC bias circuit 84 is connected to the illustrated portion.

One end of the bias voltage generating means 81, i.e., one end of the current source 91, is connected to the power source (voltage $V_{BB}$) common to the main battery feed part (5 in FIG. 7). Normally, $V_{BB}$ is $-48$ V. On the other hand, one end of the resistor 92 has connected thereto a reference voltage source of a voltage $V_{BR}$. This $V_{BR}$ is lower by 2 to 3 V from the earth voltage (0 V) and is held at a constant value between $-2$ to $-3$ V. The current $I_B$ flowing between these power sources ($V_{BB}$ to $V_{BR}$) is desirably small so as to achieve low power consumption, so use is made of a resistor 92 with a high resistance value. If this resistance value 92 is $R_{92}$, then the bias voltage $V_B$) becomes a value dropped in voltage by exactly $I_B \times R_{92}$ from $V_{BR}$ and is applied to the bias input terminal B (B1 or B2 in FIG. 7) through the voltage follower circuit 94.

Figure 10:
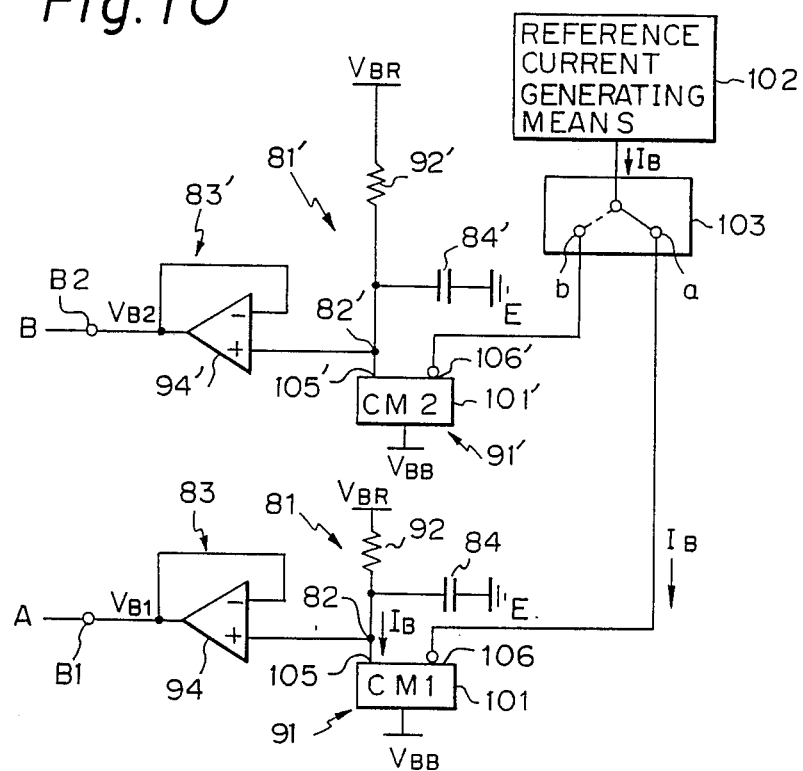
FIG. 10 is a circuit diagram showing in more detail the circuit of FIG. 9.

FIG. 10 is a circuit diagram showing in more detail the circuit of FIG. 9 and shows a bias circuit comprised so as to be suited for reverse battery feed. For the reverse battery feed, the bias circuit of FIG. 9 is provided at both the line A side and the line B side. The constitutional elements of the line B side which correspond to constitutional elements of the line A side are given the same reference numerals with dashes. Note that the voltage follower circuits 94 and 94' forming the buffer means 83 and 83' are shown as being specifically comprised of operational amplifiers. On the other hand, the current sources 91 (FIG. 9) and 91' are comprised, as illustrated, of current mirror circuits (CM1 and CM2) 101 and 101' and reference current generating means 102. The reference current $I_B$ from the reference current generating means 102 is supplied to either of the line A side or the line B side by the current switching means 103. Normally, it is connected to the contact a of the line A side and is connected to the contact b only during reverse battery feed. The current mirror circuits serve to enable inflow (or outflow) to the second terminals 105 and 105' of a current equal to the current flowing in (or flowing out from) the first terminals 106 and 106'. Using their properties, a bias current (equal to the afore-mentioned reference current $I_B$) is generated to be conducted to the resistors 92 and 92'.

During normal battery feed (i.e., not reverse battery feed), the current $I_B$ flows in through the contact a of the current switching means 103 to the first terminal 106 of the current mirror 101, and the bias current $I_B$ flows to the resistor 92 (resistance value $R_{92}$). As a result, a bias voltage $V_{B1}$ of a value dropped by exactly $I_B \times R_{92}$ from the reference voltage source $V_{BR}$ ($-2$ to $-3$ V) is obtained at the output point 82. The reference current $I_B$ is suitably set in accordance with what degree of bias voltage is to be set (since $R_{92}$ is a fixed value). In this case, at the line B side, no current flows to the first terminal 106' of the current mirror circuit 101' and, therefore, no bias current $I_B$ flows to the second terminal 105' either. Therefore, the voltage $V_{BR}$ ($-2$ to $-3$ V) of the reference voltage source appears as it as as the bias voltage $V_{B2}$.

Conversely, during reverse battery feed, the current switching means 103 is switched to the contact b. By this, the current $I_B$ flows to the resistor 92' and the bias voltage at the line B side drops to $V_{BR} - I_B \times R_{92'}$, and, at the line A side, no current flows to the resistor 92 and the bias voltage $V_{B1}$ rises to $V_{BR}$. The reverse battery feed is realized by this.

Figure 11:
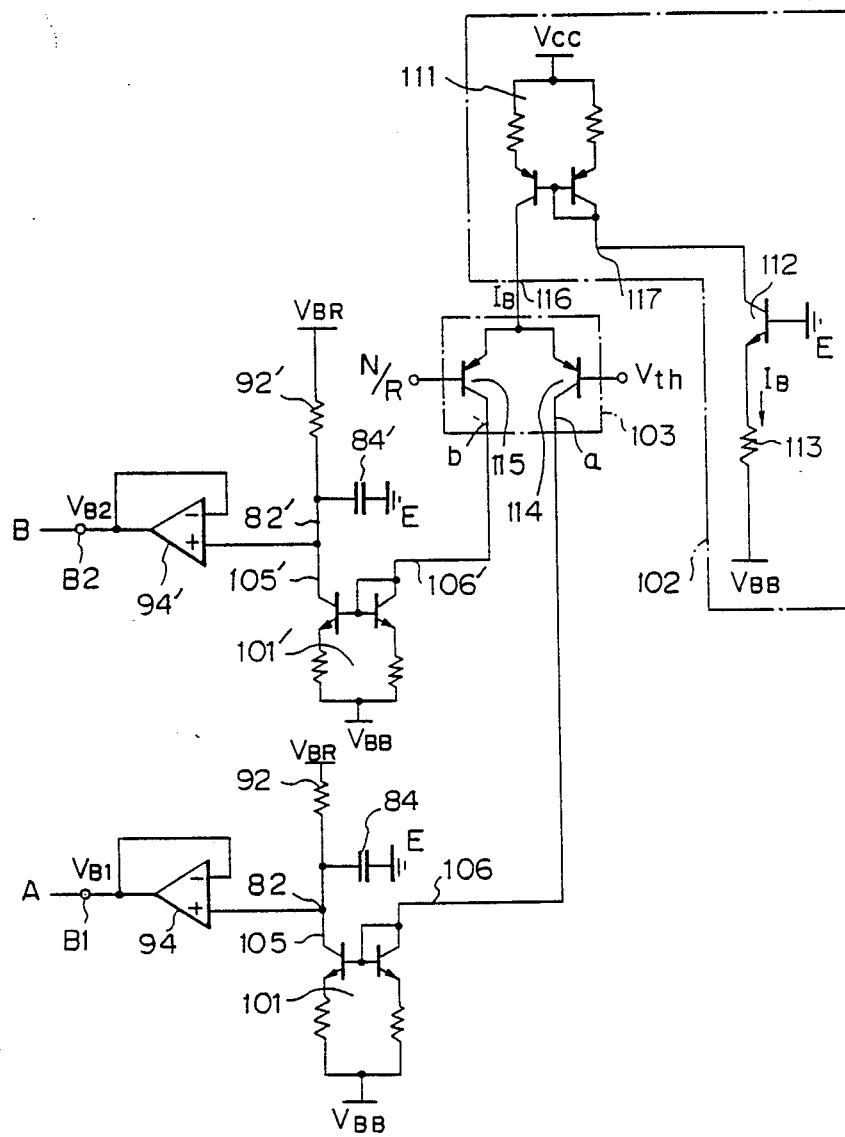
FIG. 11 is a circuit diagram showing in still more detail the circuit of FIG. 10.

FIG. 11 is a circuit diagram showing in still more detail the circuit of FIG. 10. Portions corresponding to those in FIG. 10 are given the same reference numerals. In FIG. 11, the current mirror circuits 101 and 101', the reference current generating means 102, and the current switching means 103 are shown in further detail. The reference current generating means 102 is comprised of the current mirror circuit 111 (where current flows out from the first and second terminals), the transistor 112, and the resistor 113 (resistance value $R_r$). By this construction, the current $I_B$ flowing from the transistor 112 becomes $$I_B = V_{BB}/R_r$$

and a current equal in amount to the current $I_B$ is supplied to the current switch comprised of the pair of transistors 114 and 115. The transistors 115 and 114 are supplied at their bases with an N/R (Normal/Reverse) input and threshold input $V_{th}$. During normal battery feed, N/R = "H" (high" and a current $I_B$ flows to the transistor 114 side. During reverse battery feed, N/R = "L" (low), and the current $I_B$ flows to the transistor 115 side. To set the bias voltage $V_{B1}$ ($V_{B2}$) to the desired value, the ratio of the resistance value $R_{92}$ of the resistor (92 (92')) and the resistance value $R_r$ of the above-mentioned resistor 113 is suitably selected.

Normally, the power source voltage $V_{BB}$ ($-48$ V) is not completed fixed and is accompanied by some fluctuation. Therefore, it is preferable to have the bias voltage also change in accordance with that fluctuation. In the circuit of FIG. 11, the current $I_B$ is determined by the power source voltage $V_{BB}$ and the resistor 113 ($V_{BB}/R_r$), so the fluctuation of the $V_{BB}$ becomes the fluctuation of the $I_B$ and amount of the voltage drop of the resistor 92 (92') also changes, so the bias voltage can automatically follow fluctuations in the $V_{BB}$. The power source voltage $V_{BB}$ is subjected to not only the above-mentioned DC variation, but, since it is a circuit which uses $-48$ V, is also subjected to AC noise. The mirror circuits 101 and 101' output current proportional to the current input, and the noise of the common point $V_{BB}$ is not applied to the current output. That is, the mirror circuits have high output in impedances with a constant current source. On the other hand, the current flowing in the resistor 113 is subjected to noise due to fluctuations in the $V_{BB}$. This value is given by $V_{BBN}/R_r$ (where $V_{BBN}$ is the noise voltage of $V_{BB}$). The noise current produced here passes through the mirror circuit 111 and the current switching means 103 to be applied to the mirror circuit 101 (101'). This current is biased to the earth E by the AC bypass circuit 84 (84'), and the voltage generated at the point 82 (82') is sufficiently suppressed. Note that the voltage $V_{BR}$ of the reference voltage source is set to a voltage lower from the earth by a predetermined voltage (2 to 3 V), so $V_{BR}$ itself will not fluctuate. In this case, $V_{BR}$ may be produced using a plurality of diodes connected in series.

According to the aspect of the present invention mentioned above, a bias circuit is realized which is free from entry of power source noise into the main battery feed part and a bias circuit is realized which enables easy setting of the bias voltage and further easy handling of reverse battery feed.

Next, an explanation will be given of a battery feed current control circuit, particularly a battery feed current control circuit for control of the batter feed current from a bidirectional battery feed circuit provided in a line circuit of a switching system.

As mentioned earlier, the battery feed circuit in general includes an operational amplifier. A predetermined bias voltage must be applied to the battery feed circuit to make the operational amplifier operate normally. The bias circuit is provided to supply this bias voltage. The bias circuit normally sets the line B side to a value several volts lower than the earth (0 V) and sets the line A side to a value several volts higher than the power source voltage (−48 V) (opposite cases too). The existence of this bias voltage of several volts creates a need for the battery feed current to be controlled in accordance with the distance of the telephone lines (lines A and B) to the subscriber telephones.

Figure 12:
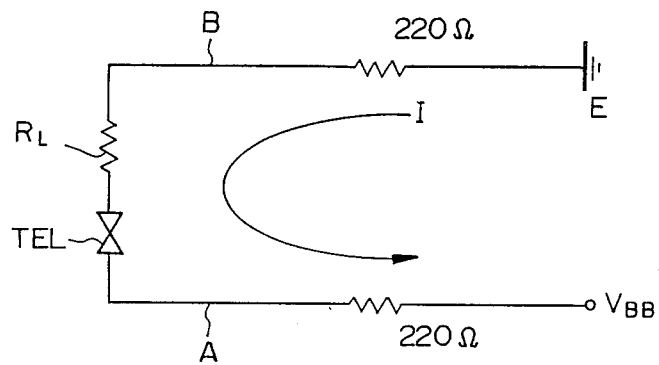
FIG. 12 is a view showing the concept of a general battery feed circuit.

FIG. 12 is a view showing the concept of a general battery feed system. In the figure, TEL is a subscriber telephone, and $R_L$ is the resistance of the telephone line and the telephone TEL, i.e., a so-called load resistance. The battery feed circuit performs the battery feed operation with respect to the load resistance $R_L$. The DC battery feed resistance is, for example, 220 ohms. Note that the I in the figure is the DC battery feed current and $V_{BB}$ is a power source voltage of, for example, −48 V. In FIG. 12, no mention is made of the bias voltage at all. In principle, battery feed is possible without a bias voltage.

However, looking at the battery feed circuit, the following may be said in general. The battery feed circuit, to be connected to the terminals of line A and line B forming the above-mentioned telephone line, must be designed so that a predetermined value is attained for the input impedance with respect to the AC signal viewed from the line A and line B. This input impedance may be roughly classified into two types and the conditions [1], [2], and [3] mentioned earlier must be satisfied.

Further, as mentioned earlier, in recent years, increasingly severe conditions have been imposed on in-phase signals. It is demanded that no distortion be caused in the voice signals even if the in-phase signal current becomes larger than the DC battery feed current I. The in-phase signal becoming larger than the DC battery feed current I means the current I will flow in the reverse direction than normal. To enable the flow of such a reverse current, the practice has been to set the bias voltage to within several volts (for example, 2 V).

Figure 13:
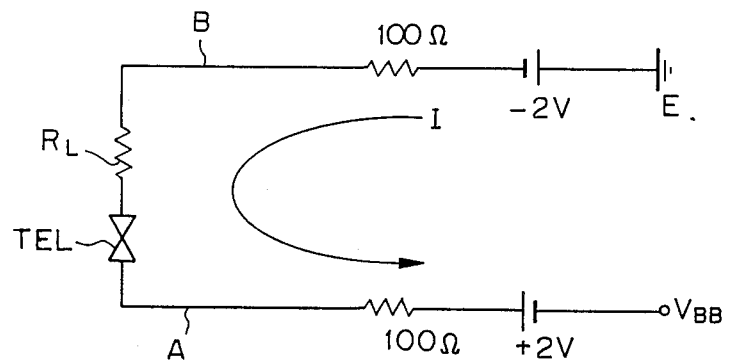
FIG. 13 is a view showing an example of a general battery feed system.

FIG. 13 is a view showing an example of a general battery feed system. The bias voltage mentioned above, set to within several volts, is illustrated as a battery of −2 V (line B side) and +2 V (line A side). A point to note in the figure is that the DC battery feed resistance has become, for example, 100 ohms, smaller than the bias-less case of FIG. 12 (220 ohms→100 ohms). The reason for this is based on the fact that the resistance must be made smaller to make up for the reduction in the battery feed current I to the telephone TEL.

Figure 14:
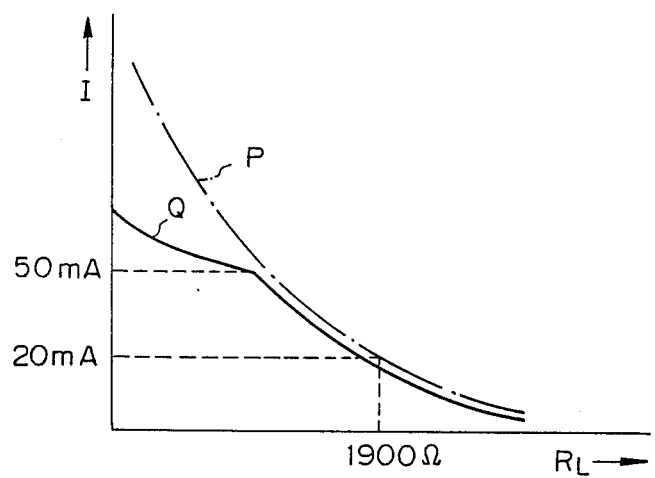
FIG. 14 is a graph showing the relationship of the load resistance $R_1$ and the battery feed current I.

FIG. 14 is a graph showing the relationship of the load resistance $R_1$ and the battery feed current I. The longer the length of the telephone line, the greater the $R_L$, but if the $R_L$ of the maximum length envisioned is, for example, 1900 ohms, the minimum guaranteed value of the battery feed current at that time would be set to, for example, 20 mA. This 20 mA is ensured by the resistance reduced to 100 ohms in FIG. 13. However, the shorter the length of the telephone lines of the subscribers, the more the $R_L$ in the graph shifts to the left in the figure. The battery feed current I rises sharply in proportion to $1/R_L$ (chain-dot curve P). Therefore, there is the inconvenience of too much battery feed current flowing to the short distance subscribers. To eliminate this inconvenience, it has been attempted to correct the characteristics of the battery feed current I in the graph to the solid curve Q. That is, the batter feed current I is suppressed to about, for example, 50 mA for short distance subscribers. By this, the inconvenience of too much battery feed current is eliminated.

Based on the above, attempts have been made in the prior art to make the battery feed resistance (corresponding to the 100 ohm values in FIG. 13) in the main battery feed part variable so as to control the magnitude of the battery feed current I in accordance with the magnitude of the load resistance $R_L$. However, there were the problems that the main battery feed part became complicated in internal structure in order to satisfy simultaneously the above-mentioned conditions [1], [2], and [3] and the technique for changing the battery feed resistance was difficult in practice.

The third aspect of the present invention was made in consideration of the above problems and provides a battery feed current control circuit which can limit the current to about 50 mA easily and without trouble and which can be easily provided with other optional functions such as reverse battery feed and balance/unbalance mode functions.

Figure 15:
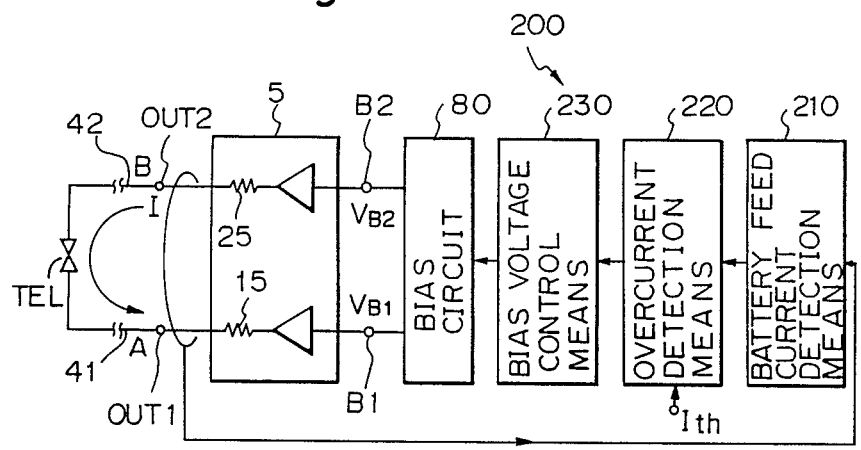
FIG. 15 is a view showing the principle blocks and peripheral circuits of the battery feed current control circuit according to the present invention.

FIG. 15 is a view showing the principal blocks and peripheral circuits of the battery feed current control circuit according to the present invention. As the peripheral circuits, a main battery feed part 5 and bias circuit 80 are shown. The main battery feed part 5 is provided with bias input terminals B1 and B2 which receive bias voltages $V_{B1}$ and $V_{B2}$ (FIG. 10) from the bias circuit 80 and battery feed terminals OUT1 and OUT2 for transmitting the battery feed current I to the telephones TEL through the line A 41 and the line B 42. Further, reference numerals 15 and 25 in the main battery feed part 5 show the previously mentioned battery feed resistors. An explanation of the input-output portion of the voice signals (transformers etc.) is omitted (see FIG. 3).

The battery feed current control circuit 200 according to the present invention is comprised of a detection means 210 for detecting the battery feed current I, a detection means 220 for detecting the amount of overcurrent $(I-I_{th})$ when the battery feed current I is over a predetermined value $I_{th}$, and a bias voltage control means 230 which changes the bias voltages $V_{B1}$ and $V_{B2}$ from the bias circuit 80 in accordance with the amount of overcurrent $(I-I_{th})$. The operation will be explained below.

As mentioned earlier, in the prior art attempts have been made to change the battery feed current I by changing the resistance values of the battery feed resistors 15 and 25 in FIG. 15, but in the present invention, the bias voltages $V_{B1}$ and $V_{B2}$ are changed so as to change the battery feed current I. This enables easy realization of the circuit and further enables realization of optional functions.

Figure 16:
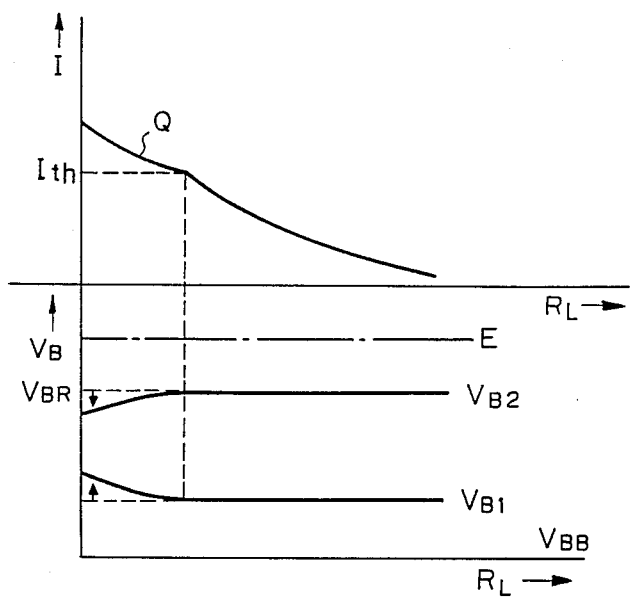
FIG. 16 is a graph for explaining the operation of the battery feed current control circuit according to the present invention.
Figure 17:
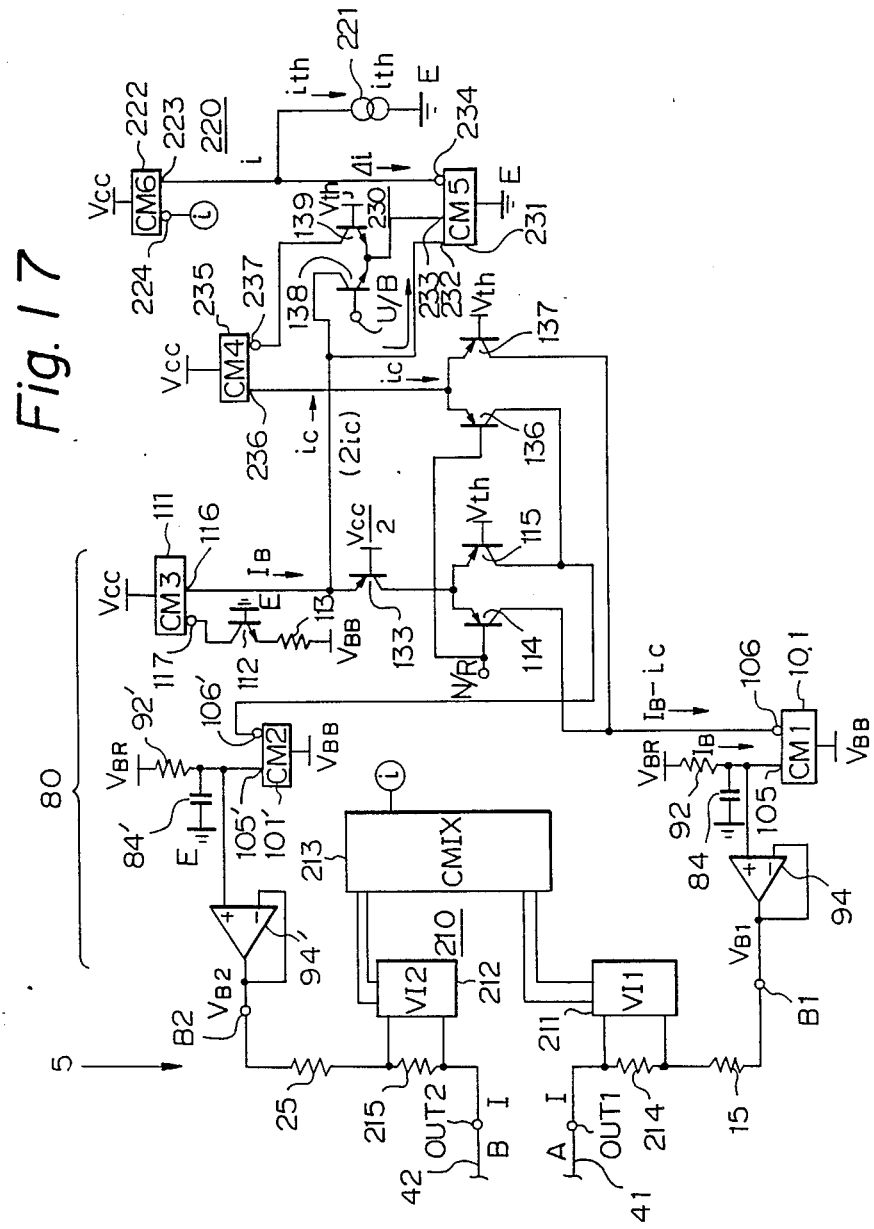
FIG. 17 is a view showing an example of the battery feed current control circuit and peripheral circuits according to the present invention.

FIG. 16 is a graph for explaining the operation of the battery feed current control circuit according to the present invention. The top half corresponds to the graph of FIG. 14. The bottom half shows that the bias voltages $V_B$ is controlled by the present invention. The voltage (0V) of the earth E is shown by the chain-dot line E. The power source voltage $V_{BB}$ is made to match the horizontal axis. The closer the subscriber in distance, the smaller the load resistance $R_L$ and the greater the battery feed current I, but by the battery feed current control circuit 200, once I rises above a predetermined value $I_{th}$, at least one of the bias voltage $V_{B2}$ of the line B side and the bias voltage $V_{B1}$ of the line A side is changed to bring the two closer and reduce the battery feed current I through control. FIG. 16 shows the case where both of $V_{B1}$ and $V_{B2}$ are brought closer FIG. 17 is a view showing an example of the battery feed current control circuit and peripheral circuits according to the present invention. First, looking at the overall construction of the circuit of the figure, the main battery feed part 5 is shown as simply the battery feed resistors 11 and 12, the battery feed terminals OUT1 and OUT2, and the bias input terminals B1 and B2. The bias circuit 80 is shown by the constitutional elements given the reference numerals used in FIG. 11. The battery feed current detection means 210 is shown by the constitutional elements given the reference numerals 211 to 215. The overcurrent detection means 220 is shown by the constitutional elements given the reference numerals 221 to 224. Further, the bias voltage control means 230 is shown by the constitutional elements given the reference numerals 231 to 237 and 36 to 39.

The battery feed current detection means 210 may be one which is able to find the magnitude of the battery feed current I, but in this embodiment, the voltage drop caused at the detection resistors 214 and 215 by the current I is converted into current values by the voltage/current converters (VI) 211 and 213 and the results are mixed by a current mixer (CMIX) 213 for use as the detection current i. This i is proportional to the battery feed current I. This detection current i is made to flow out from the first terminal (224) of the current mirror circuit 222 (right top of figure). Note that the voltage/current converters 211 and 212 are provided at the line A side 41 and the line B side 42 and the results are mixed by the mixer 213 so as to cancel the in-phase signals mentioned earlier.

The detection current i is applied to the first terminal (224) of the sixth current mirror circuit (CM6) 222 forming part of the overcurrent detection means 220. A constant current source 221 is connected to the second terminal (223) and a constant current $i_{th}$ proportional to the above-mentioned predetermined value $I_{th}$ of the battery feed current I is made to flow out at all times. When the battery feed current I exceeds the predetermined value $I_{th}$ by the overcurrent amount $\Delta I$ ($=I-I_{th}$), an overcurrent $\Delta i$ ($=i-i_{th}$) is produced corresponding to the same. This $\Delta i$ is a control factor for the bias voltage control, i.e., the battery feed current control. Note that current mirror circuits are employed because they are in themselves high in output impedance and are effective for suppressing the entry of power source noise into the bias circuit side.

The above-mentioned overcurrent $\Delta i$ is processed as follows for the control of the bias voltage. First, the overcurrent $\Delta i$ is drawn into the first terminal 234 of the fifth current mirror circuit (CM5) forming part of the bias voltage control means 230. A current equal in amount to the $\Delta i$ is used as the control current $i_c$ and drawn into the second terminal 232 to change the current and voltage state in the bias circuit 80.

The bias circuit 80 has on the bias voltage control means 230 side a third current mirror circuit (CM3) 111 forming the current source, a transistor 112, a resistor 113, and a buffer transistor 133 and has on the main battery feed part 5 side a first current mirror circuit (CM1) 101, a resistor 92, and a voltage follower circuit 94 (all for the line A) and the same constitutional elements 101', 92', and 94' (all for the line B). Looking at the line A 41 side, the reference voltage source of the reference voltage $V_{BR}$ is connected to one end of the resistor 92. This $V_{BR}$ is held to a constant value between $-2$ to $-3$ V, which is 2 to 3 V lower than the earth voltage. Here, if the resistance value of the resistor 92 is $R_{92}$, the value dropped in voltage by $I_B \times R_{92}$ from $V_{BR}$ becomes the bias voltage $V_{B1}$ and is applied to the bias input terminal B1 through the voltage follower circuit 94. The current $I_B$ at this time is the current which flows into the second terminal 105 of the current mirror circuit 101 and is equivalent to the current which flows into the first terminal 106. The current which flows into the first terminal 106 is the current $I_B$ which passes through the transistor 114 (the transistor 115 is off) and is transmitted from the second terminal 116 of the third current mirror circuit 111. This current is equal to the current produced at the first terminal 117 side. This is the current which lows through the transistor 112 and has a magnitude of $V_{BB}/R_{139}$ ($R_{139}$ being the resistance value of the resistor 139). The above explanation was made with reference to the line A 41 side. On the line B 42 side, the transistor 115 is off and no current at all flows to the first terminal 106' of the second current mirror circuit 101', so no current either flows to the second terminal 105', there is no voltage drop at the resistor 92', and the voltage $V_{BR}$ becomes the bias voltage $V_{B2}$ as it is. This state is equivalent to the state in the lower half of the graph of FIG. 16 where $V_{B1}$ and $V_{B2}$ are held to predetermined constant values (when I is smaller than $I_{th}$).

Here, if the load resistance $R_L$ becomes smaller and the battery feed current I becomes larger than $I_{th}$ by $\Delta I$, the afore-mentioned control current $i_c$ is drawn into the bias voltage control means 230. Therefore, the current $I_B$ from the current mirror (CM3) 111 is reduced to $I_E - i_c$. The reduced current $I_B - i_c$ reaches the current mirror circuit 101 from the transistor 114 and the voltage drop at the resistor 92 becomes smaller than before by $i_c \times R_{92}$. That is, the bias voltage $V_{B1}$ rises by $i_c \times R_{92}$ (see rise of $V_{B1}$ in FIG. 16).

On the other hand, looking at the bias voltage $V_{B2}$ side, the third terminal 233 of the fifth current mirror circuit (CM5) 231 receives an inflow of a current ($\Delta i$, that is, equivalent to $i_c$) flowing out from the first terminal 237 of the fourth current mirror circuit (CM4) 235 via the transistor 139. Therefore, $i_c$ flows out from the second terminal 236 of the current mirror circuit 235, passes through the transistor 136 (the transistor 137 is off), and flows into the current mirror circuit 101' in the bias circuit 80. Therefore, a voltage drop of $i_c \times R_{92'}$ occurs at the resistor 92' (resistance value of $R_{92'}$) causing a fall in $V_{B2}$ of the graph of FIG. 16.

The above explanation was on the basic operation of the battery feed current control circuit. In addition, the reverse battery feed and balance-unbalance mode functions can be handled. Reverse battery feed, as mentioned earlier, refers to the reversal of the direction of the current (A→B) from the normal flow of the DC battery feed current I from the line B 42 to the line A 41 and is used in the case of provision of high grade services such as automatic termination. To reverse the current I, a current switch is formed by the transistors 114 and 115 and these selectively made on an off by an N/R (normal/reverse) input. During normal (N) battery feed, N/R="L" and the transistor 114 is on (the transistor 115 is off). During reverse (R) battery feed, the transistor 115 is on (the transistor 114 is off) and the levels of $V_{B1}$ and $V_{B2}$ in the graph of FIG. 16 are reversed.

To handle this reverse battery feed, in the bias voltage control means 230 too, transistors 136 and 137 forming a current switch are formed. The previously mentioned current $i_c$ flowing through the transistor 136 is switched to the transistor 137 during the reverse battery feed (the transistor 136 is turned off).

Next, the balance-unbalance mode means the mode of making the bias voltages $V_{B1}$ and $V_{B2}$ balanced or unbalanced. The operations explained above were all for the balance mode.

Figure 18:
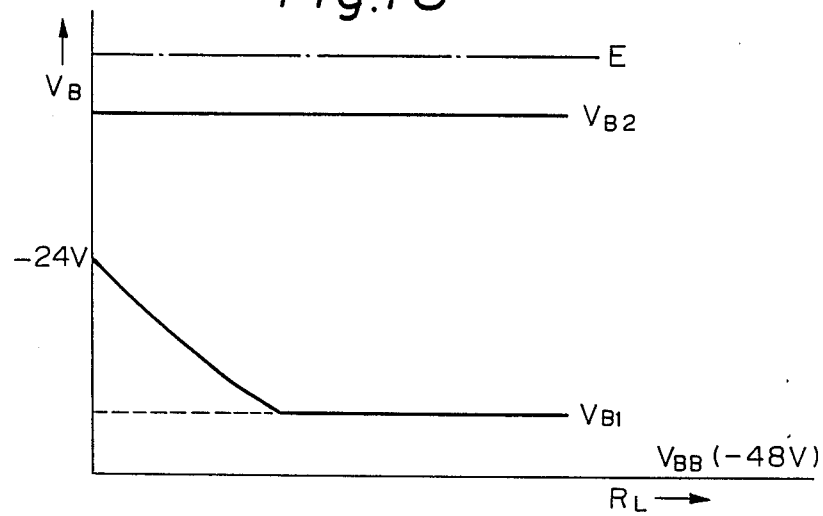
FIG. 18 is a graph for explaining the unbalance mode.

FIG. 18 is a graph for explaining the unbalance mode and corresponds to the above-mentioned FIG. 3. In the graph of FIG. 17, the bias voltages $V_{B1}$ and $V_{B2}$ are changed in the same way, but in the unbalance mode of FIG. 18, the bias voltage $V_{B2}$ is left as is and the voltage $V_{B1}$ alone is raised so as to suppress the battery feed current I to the predetermined value $I_{th}$. To realize this unbalance mode, making the explanation with reference to the case of a normal battery feed, the current flowing through the transistor 114 need only be made from $I_B - i_c$ at the afore-mentioned balance mode to $I_B - 2i_c$. That is, it is only necessary to raise the amount of voltage rise by the resistor 92 from $i_c \times R_{92}$ to $2i_c \times R_{92}$. On the other hand, on the line B side, it is only necessary to change the current flowing into the current mirror circuit 105' at the balance mode to zero. That is, it is only necessary to make the voltage drop due to the resistor 92' zero. Therefore, the transistors 138 and 139 forming a current switch are provided and selectively turned on and off by the U/B (unbalance/balance) input. In the balance mode, the U/B input is "L", the transistor 139 is on, and the transistor 138 is off, so the conditions are the same as the previous explanation of operation. On the other hand, when U/B becomes "H" and the unbalance mode is entered, the transistor 138 turns on and the transistor 139 turns off. After the transistor 139 turns off, the previously mentioned current flowing out from the first terminal 237 of the current mirror circuit (CM4) 235 ($\Delta i$, that is, equivalent in amount to $i_c$) becomes 0 and the current supplied to the current switch (136 and 137) becomes zero. By this, the above-mentioned condition of making the voltage drop by the resistor 92' zero is satisfied. Since the transistor 138 turns on along with the transistor 139 turning off, the control current from the current mirror 111 becomes the sum of the $i_c$ flowing in to the third terminal 233 of the current mirror 231 and the $i_c$ flowing into the second terminal 232 thereof originally, i.e., doubles to $2i_c$. Therefore, the current flowing through the transistor 133 and the transistor 134 (during normal battery feed) falls from he $I_B - i_c$ of the balance mode to $I_B - 2i_c$. This results in the previously mentioned condition of making the current $I_B - 2i_c$ satisfied and forms the unbalance mode. In the unbalance mode, it is possible to create a considerably large voltage gap between the bias voltage $V_{B1}$ of the line A and the power source voltage $V_{BB}$ and, in the case of FIG. 18, to raise the level with respect to the power source voltage $V_{BB}$ (−48 V) to, for example, −24 V. This causes a decline in the power consumption at the battery feed circuit etc. However, with reduction from −48 V to −24 V (reduction of voltage value) by resistor voltage division, a power loss (heat generation) is caused by the voltage dividing resistors, so this is meaningless. Therefore, to reduce the value from −48 V to −24 V, it is necessary to use a low power loss type converter such as a so-called DC-DC converter.

As mentioned above, according to the present invention, it is possible to control the battery feed current relatively simply without further control of the main battery feed part and is possible to suppress overflow of battery feed current caused in the case of short distance subscribers. Further, it is possible to easily realize reverse battery feed and balance/unbalance mode functions.

Next, an explanation will be made of a battery feed current supervising circuit, more particularly a battery feed current supervising circuit for supervising the battery feed current from a battery feed circuit provided in a line circuit of a switching system.

A battery feed current supervising circuit (below, referred to as just a supervising circuit) supervises the battery feed circuit from a main battery feed part so as to detect, together with a scanner (SCN), an off-hook state, on-hook state, or dialing pulse and detect, together with an alarm equipment, (ALM), a ground fault, false connection to the battery, and other abnormalities. In addition, it detects when the battery feed current is too large (for example, when the distance to the subscriber is short) and suppresses the current and performs a wide variety of other functions.

The most important portion of the supervising circuit is the portion which detects the battery feed current, but it is necessary to detect not only the forward direction current, but also the reverse direction current. This is because, as mentioned before, it is necessary to guarantee that the normal voice signal does not deteriorate in quality even if the in-phase signal current becomes larger than the battery feed current. Therefore, it is not only necessary that the battery feed circuit itself can perform bidirectional battery feed in both the forward and reverse directions, but also that the supervising circuit can perform bidirectional current detection in both the forward and reverse directions. Further, it is necessary to perform current detection in the forward and reverse directions even when considering performing reverse battery feed.

Figure 19:
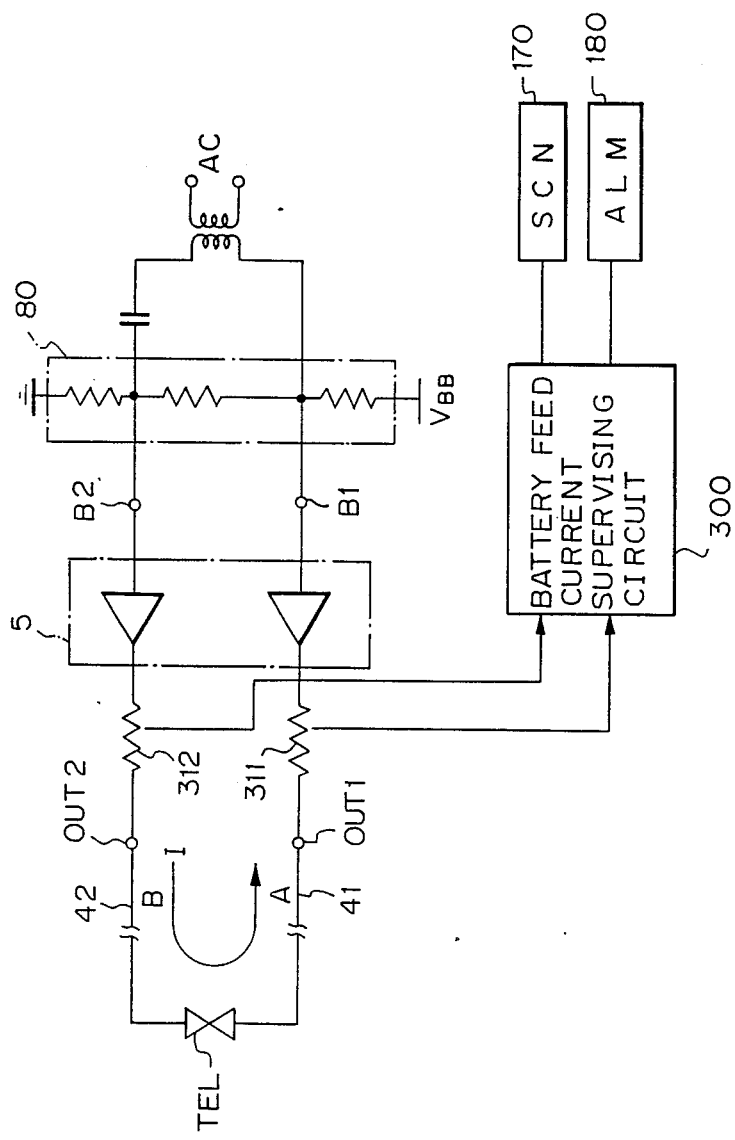
FIG. 19 is a view illustrating a general switching system.

FIG. 19 is a view illustrating a general switching system in which the main battery feed part 5 sends a battery feed current I to a subscriber telephone TEL via the line A 41 and the line B 42 from the battery feed terminals OUT1 and OUT2. The main battery feed part 5 includes an operational amplifier and, for its suitable operation, receives a bias voltage from a bias circuit 80 by the bias input terminals B1 and B2. Note that the input-output portion of the original voice signal AC is suitably selected. In the figure, the portion drawn as a transformer at the right of the bias circuit 80 is used as an input-output portion.

The battery feed current supervising circuit is the block represented by the reference numeral 300 and is provided at its input portion with detection resistors 311 and 312 through which the battery feed current I is passed. As mentioned earlier, the supervising circuit 300 performs various functions in cooperation with the other group of equipment. The other group of equipment is shown as the scanner 170, alarm equipment 180, etc.

Figure 20:
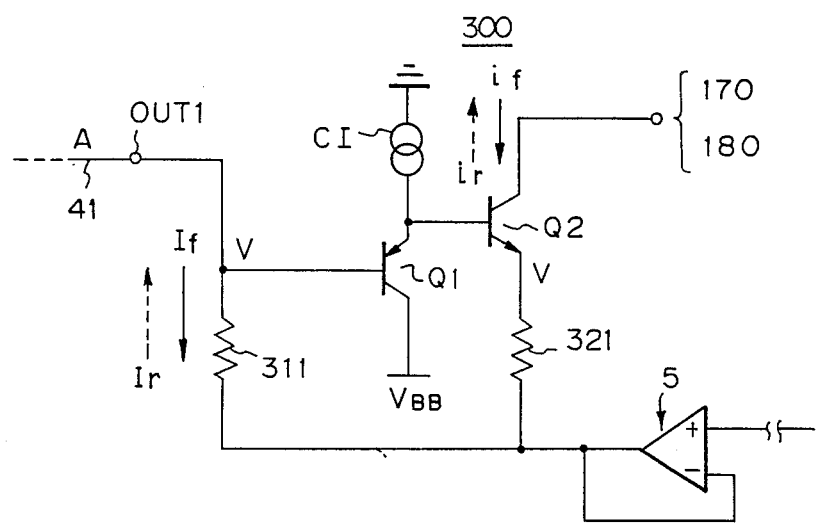
FIG. 20 is a circuit diagram showing one example of a conventional supervising circuit.

FIG. 20 is a circuit diagram showing one example of a conventional supervising circuit and shows just the line A side. The line B side has the same construction. As shown in the figure, the conventional supervising circuit 300 is comprised of two transistors Q1 and Q2, a constant current source CI, a detection resistor 311, and a voltage/current converting resistor 321. At the periphery are the main battery feed part 5, battery feed terminal OUT1 and line A 41 shown in FIG. 19. When a normal forward direction battery feed current $I_f$ flows to the detection resistor 311, the voltage V generated there is detected by the transistor Q1 by a high impedance. The emitter-base voltage is compensated by the transistor Q2, then the above-mentioned voltage V is generated at the emitter of the transistor Q2. As a result, a detection current $i_f$ proportional to the voltage V flows to the voltage/current converting resistor 321. This is further applied to the cooperating group of equipment 170, 180, etc. Note that the power source voltage $V_{BB}$ is, for example, $-48$ V and that a current always flows from the constant current source CI to keep the transistor Q1 in constant operation. Further, $i_f$ is given by the following formula:

$$i_f = R_{311}/R_{312} \times I_f$$

where, $R_{311}$ and $R_{312}$ are the resistance values of the resistors 311 and 312, respectively.

In the supervising circuit of FIG. 20, the detection current $i_f$ flows from the collector of the transistor Q2 through the emitter for the desired supervision. However, there is a large AC induction. When, based on this, the in-phase signal current becomes larger than the battery feed current I, a current $I_r$ flows in the reverse direction. In this case, the transistor Q2 must pass a reverse detection current $i_r$. However, the transistor can only pass current one way, so $i_r$ cannot be detected. Even if separate transistors Q1 and Q2 or the like were provided in parallel for passing current in the reverse direction, there would be a limit to the range of the voltage V in practice and thus this would not be practical. In the end, there is a problem of difficult detection of current in both the forward and reverse directions in conventional supervising circuits.

The fourth aspect of the present invention was made in consideration of this problem and provides a battery feed current supervising circuit which can handle battery feed current in both the forward and reverse directions.

Figure 21:
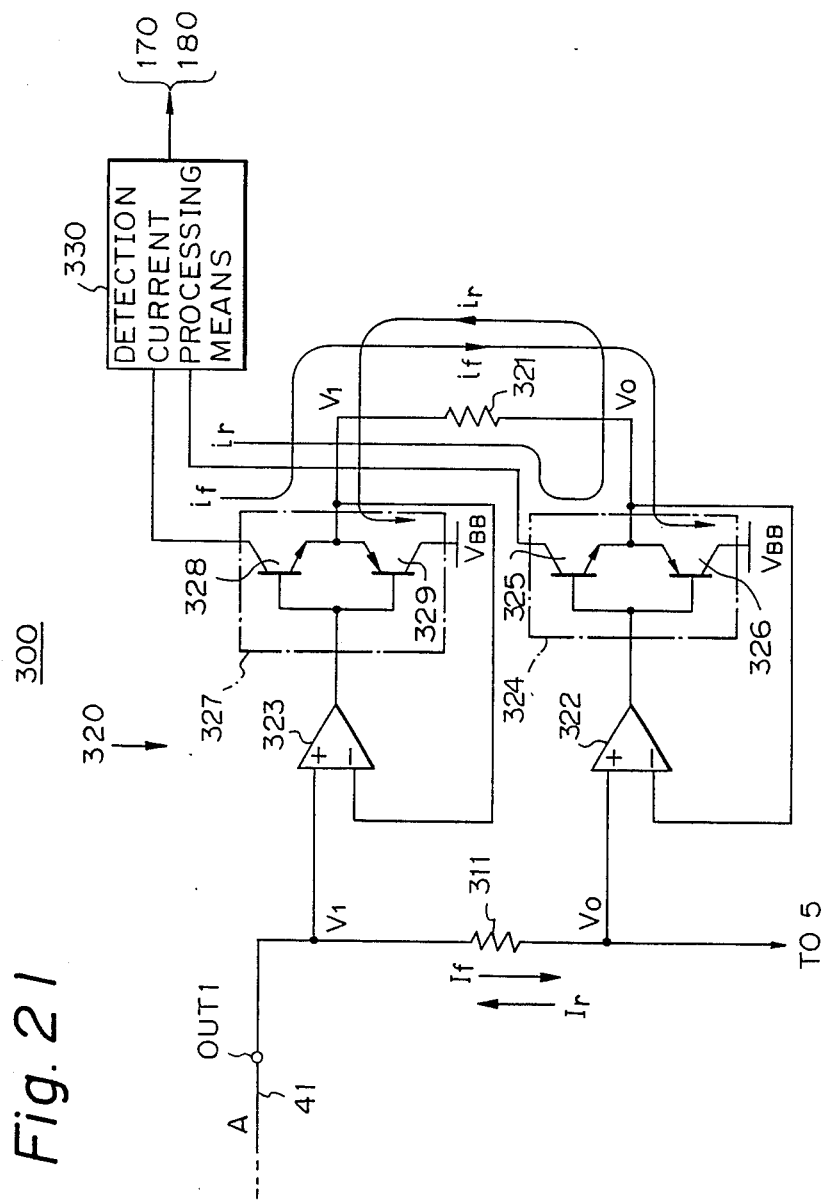
FIG. 21 is a view showing principal portions of the battery feed current supervising circuit according to the present invention.

FIG. 21 is a view showing principal portions of the battery feed current supervising circuit according to the present invention. In the figure, the battery feed current supervising circuit 300 is comprised of a battery feed current detecting means 320, which forms the major part of the circuit, and a detection current processing means 330, which performs the required processing on the detection current detected there for supervision. The battery feed current detection means 320 is comprised of a first operational amplifier 322 and second operational amplifier 323 with noninverting inputs connected to the two ends of the detection resistor 311, respectively, a first emitter follower circuit 324 comprised of an NPN transistor 325 and PNP transistor 326 having commonly connected first bases and commonly connected first emitters connected to the output of the first amplifier 322, a second emitter follower circuit 327 comprising an NPN transistor 328 and PNP transistor 329 having commonly connected second base and commonly connected second emitters connected to the output of the second amplifier 323, and a voltage/current converting resistor 321 which is connected between the commonly connected first emitters connected to the inverting input of the first operational amplifier 322 and the commonly connected second emitters connected to the inverting input of the second operational amplifier 232 and which converts the voltage between the first and second emitters to current. This means obtains a forward direction detection current $i_f$ through the NPN transistor 328 and PNP transistor 326 and obtains a reverse direction detection current $i_r$ through the PNP transistor 329 and NPN transistor 325 and supplies these detection currents $i_f$ and $i_r$ to the detection current processing means 330. The operation thereof is as follows:

When a normal forward direction battery feed current $I_f$ flows, voltages $V_0$ and $V_1$ ($V_1 > V_0$) are generated across the detection resistor 311. These voltages $V_0$ and $V_1$ appear at the two ends of the converting resistor 321 (resistance $R_{321}$) as they are through the first and second operational amplifiers 322 and 323 having high impedances. Here, the $V_1 - V_0/R_{321}$ detection current $i_f$ [$=R_{311}/R_{321} \times I_f$] is obtained through the transistors 328 and 326 at the first and second emitter follower circuits 324 and 327.

In general, an emitter follower circuit does not have a voltage gain, but has a high current gain and further has a collector connected directly to the power source. In the present invention, the collector is not directly connected to the power source, but is directly connected to the current processing means 330.

On the other hand, when the reverse direction battery feed current $I_r$ is flowing, the voltages $V_0$ and $V_1$ appearing across the detection resistor 311 reverse to $V_1 < V_0$ and the detection current flowing to the converting resistor 321 inverts from $i_f$ to $i_r$. At this time, a detection current $i_r$ flows through the transistors 325 and 329 at the first and second emitter follower circuits 324 and 327.

Figure 22:
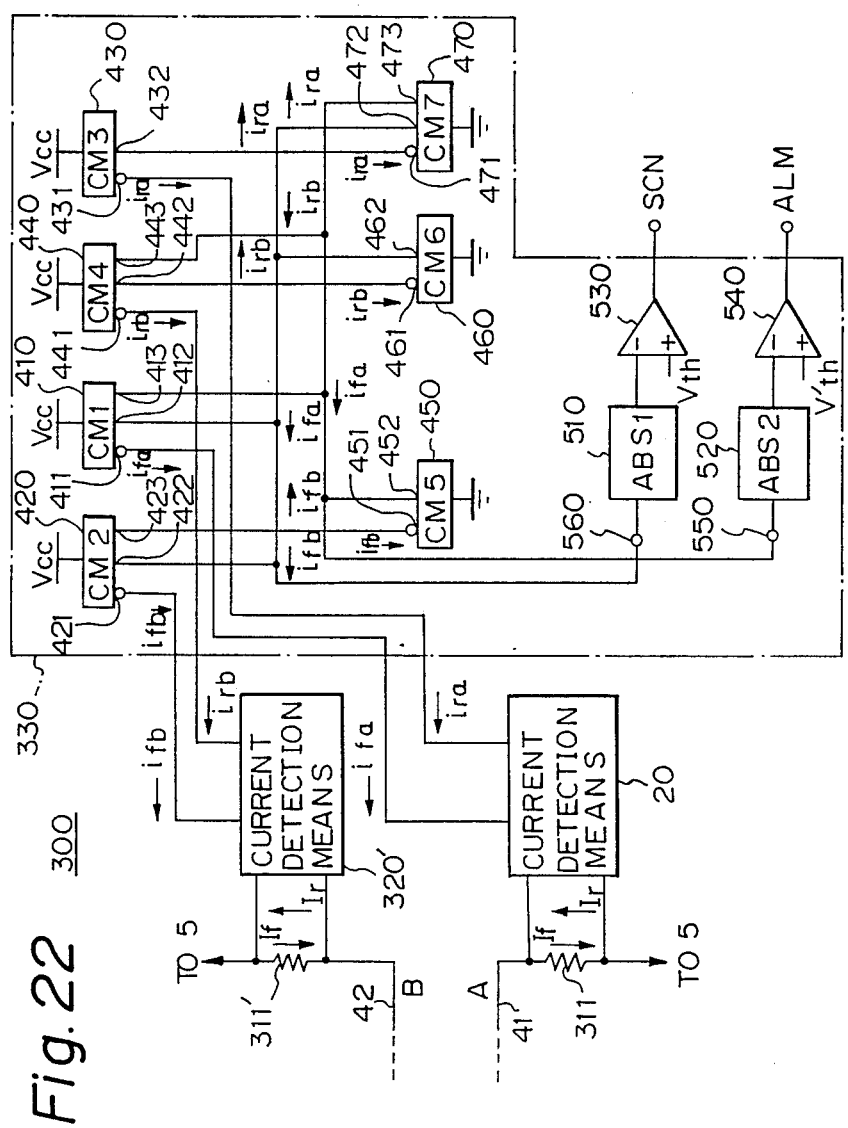
FIG. 22 is a view showing one embodiment of the battery feed current supervising circuit according to the present invention.

FIG. 22 is a view showing one embodiment of the battery feed current supervising circuit according to the present invention. The portion shown in FIG. 21 as the battery feed current detection means 320 is shown not only on the line A 41 side, but also on the line B 42 side as 320'. The input portion detection resistor is shown by 311'. The forward direction detection currents $i_{fa}$ and $i_{fb}$ and the reverse direction detection currents $i_{ra}$ and $i_{rb}$ are given to the detection current processing means 330 by the detection means 320 and 320' on the line A side and the line B side. The detection current processing means 330 is provided with seven current mirror circuits (CM1 to CM7) 410 to 470. These perform the required addition and subtraction operations and further supply the added or subtracted detection current through the absolute value circuits (ABS1 and ABS2)

510 and 520 and the comparator circuits 530 and 540 to the scanner (SCN) and the alarm equipment (ALM).

Here, the significance of the addition and subtraction operations of the current mirror circuits 410 to 470 will be clarified. Addition and subtraction operations are required when the harmful previously mentioned in-phase signal current becomes too large so as to eliminate the same.

Figure 23:
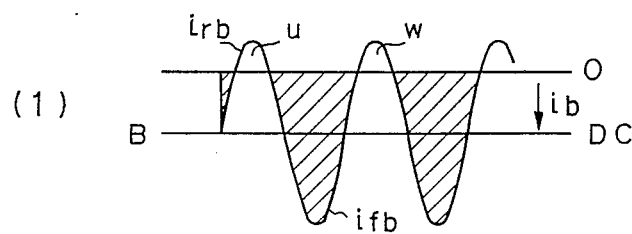
FIGS. 23(1), (2), (3), (4), and (5) are views showing the detection currents and the processed waveforms thereof accompanying in-phase signals.
Figure 23:
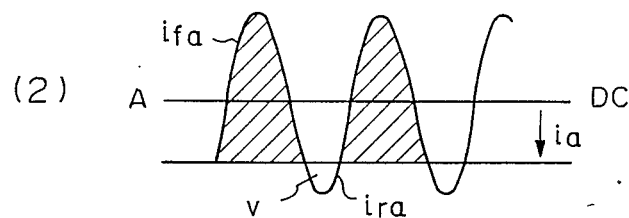
Figure 23:
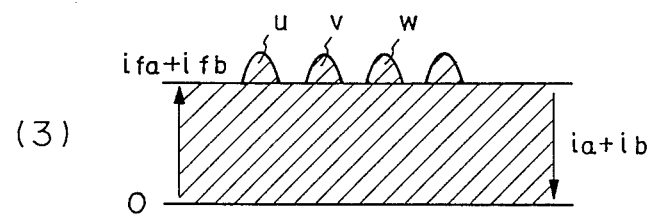
Figure 23:
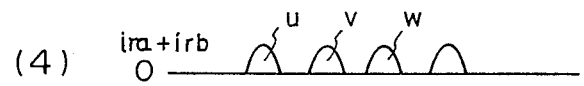
Figure 23:
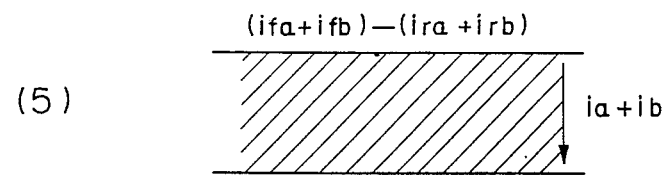

FIGS. 23(1), (2), (3), (4), and (5) are views showing the detection currents and the processed waveforms thereof accompanying in-phase signals. FIG. 23(1) shows the superposition of an excessively large in-phase signal current exceeding $i_b$ on the DC battery feed current on the line B 42 side (detection current $i_b$) and the appearance of the reverse direction detection current $i_{rb}$ and the forward direction detection current $i_{fb}$. FIG. 23(2) shows the superposition of the excessively large in-phase signal current on the DC battery feed current on the line A 41 side (detection current $i_a$) and the appearance of the forward direction detection current $i_{fa}$ and the reverse direction detection current $i_{ra}$. These in-phase signal current components would hinder accurate supervision of the battery feed current, so processing is performed to extract just the pure battery feed current component $(i_a+i_b)$ as shown in FIG. 23(5). For this processing, first the forward direction detection currents of the line A 41 side and the line B 42 side are added. This addition operation $(i_{fa}+i_{fb})$ gives the processed waveforms of FIG. 23(3). In these processed waveforms, the protruding waveforms of u, v, and w (undesired waveforms) correspond to the u, v, and w of FIGS. 23(1) and (2).

Next, the reverse direction detection currents of the line A 41 side and the line B 42 side are added. This addition operation $(i_{ra}+i_{rb})$ gives the processed waveforms of FIG. 23(4). The processed waveforms are the above-mentioned undesired waveforms u, v, w, etc.

Therefore, the waveforms of FIG. 23(4) are removed from the waveforms of FIG. 23(3) to extract the desired battery feed current component of FIG. 23(5). Looking at this as addition/subtraction processing, it is equivalent to the operation:

$$(i_{fa}+i_{fb})-(I_{ra}+i_{rb}) \qquad (9)$$

This operation is performed by the detection current processing means 330. The first nomial of the above formula (9), that is, $(i_{fa}+i_{fb})$, is output as the sum of the currents flowing from the second terminals 412 and 422 of the current mirror circuits 410 and 420 in FIG. 22, whil the second nomial of the above formula (9), i.e., $-(i_{ra}+i_{rb})$, is output as the sum of the currents flowing into the second terminals 462 and 472 of the current mirror circuits 460 and 470. Note that the current mirror circuits cause current equal in amount to the currents flowing out of or into the first terminals 411 to 471 to flow out or or into the corresponding second terminals 412 to 472. Similarly, they cause currents equal to those to flow out from the third terminals 413, 423, and 443 and into the third terminal 473. Therefore, $(i_{fa}+i_{fb})-(i_{ra}+i_{rb})$ appears at the port 560, which corresponds to FIG. 23(5). The absolute value of the current of the port 560 is obtained at the absolute value circuit 510. When the comparator circuit 530 detects that it is larger than a predetermined set value, it is deemed that there is a battery feed current. The absolute value is taken at the absolute value circuit 510 (same for 520) to handle reverse battery feed.

Figure 24:
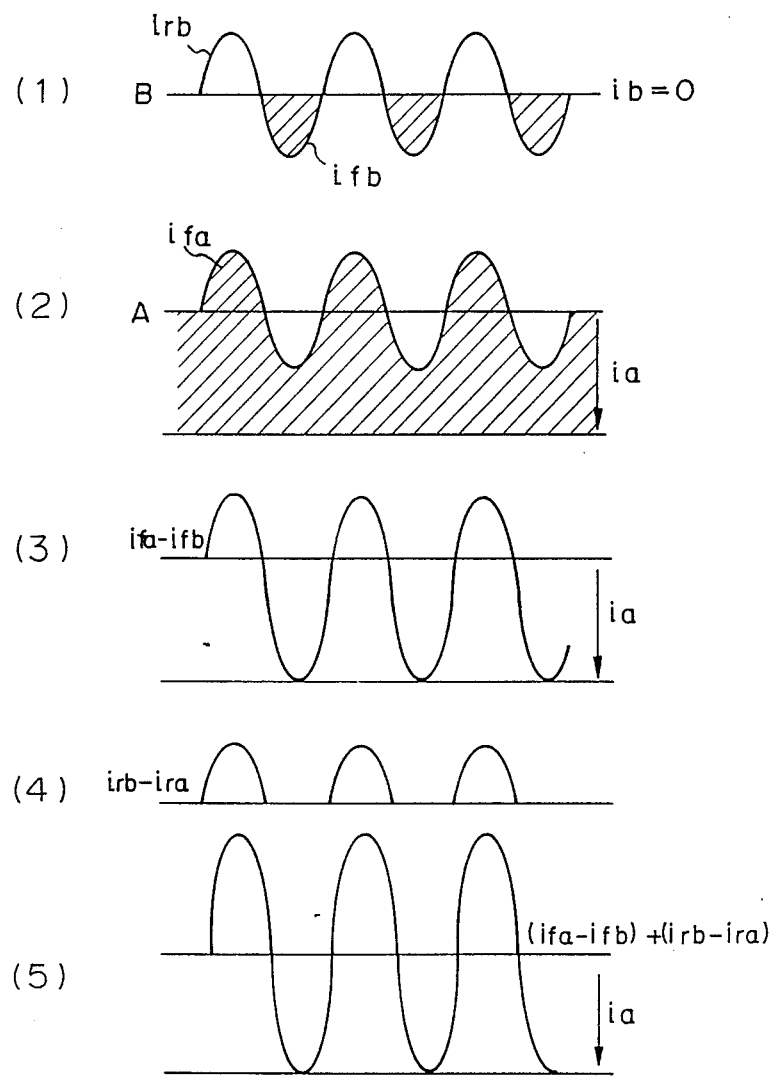
FIGS. 24(1), (2), (3), (4), and (5) are views showing the detection current and its processed waveforms accompanying ground fault accident.

FIG. 24(1), (2), (3), (4), and (5) are views showing the detection current and its processed waveforms accompanying ground fault accidents. The figures show the example of a ground fault accident occurring on the line A 41 side. The current at the time of the ground fault accident appears at the port 550 of FIG. 22 and is output through the absolute value circuit 520 (to enable application to resistor battery feed too) and the comparator circuit 540 to drive the alarm equipment ALM.

In FIG. 24(1), the battery feed current component is 0 ($i_b$=0), but only the in-phase signal component is visible. In FIG. 24(2), the in-phase signal component is superimposed and $i_{fa}$ and $i_{ra}$ are formed. The difference between the forward direction currents ($i_{fa}-i_{fb}$) is obtained, the waveform of FIG. 24(3) is obtained, and the in-phase signal component is stressed Further, the difference between the reverse direction currents ($i_{rb}-i_{ra}$) is taken (see FIG. 24(4)), applied to the waveform of FIG. 24(3), and the in-phase signal component further stressed (see FIG. 24(5)). This waveform of (5) enables detection of the occurrence of ground faults. These are detected by the operation:

$$(i_{fa}-i_{fb})+(i_{rb}-i_{ra}) \qquad (10)$$

The first nomial in formula (2), i.e., $(i_{fa}-i_{fb})$, is found by the combination of the current $i_{fa}$ from the third terminal 413 of the current mirror circuit 410 in FIG. 22 and the current $i_{rb}$) to the second terminal 452 of the current mirror circuit 450, while the second nomial, i.e., $(i_{rb}-i_{ra})$, is found by the combination of the current $i_{rb}$ from the third terminal 443 of the current mirror circuit 440 in FIG. 22 and the current $i_{ra}$ to the third terminal 473 of the current mirror circuit 470. These appear at the port 550. When the comparator circuit 540 detects that the absolute value (by the circuit 520) exceeds a predetermined value, the alarm equipment ALM is notified.

Figure 25:
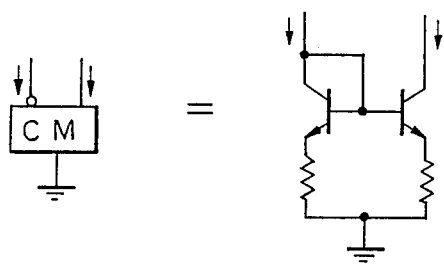
FIG. 25 is a view showing one example of a current mirror circuit (inflow type)
Figure 26:
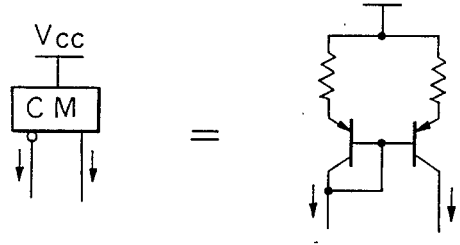
FIG. 26 is a view showing one example of a current mirror circuit (outflow type)
Figure 27:
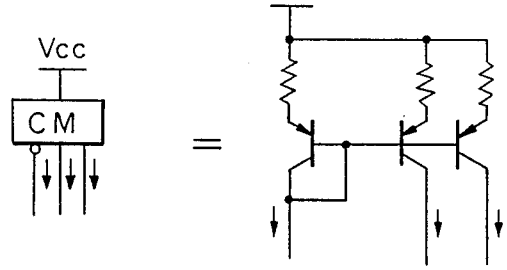
FIG. 27 is a view showing an example with even more terminals as in FIG. 26.

FIG. 25 is a view showing one example of an inflow type current mirror circuit, and FIG. 26 is a view showing one example of an outflow type current mirror circuit. FIG. 27 is a view showing an example with even more terminals as in FIG. 26. The construction is the same, however, as in FIG. 25 even when the number of terminals is increased.

As mentioned above, acccrding to the present invention, a battery feed current supervising circuit is realized which can handle not only forward direction but also reverse direction battery feed current.

Next, an explanation will be made of a current detection circuit, more particularly a battery feed current detection circuit for detecting the battery feed current from a bidirectional battery feed circuit provided in a line circuit of a switching system.

The battery feed current detection circuit cooperates with a normal battery feed current supervising circuit to supervise the battery feed current from the main battery feed part so as to detect the off-hook state, on-hook state, and dialing pulses together with the scanner (SCN) and to detect ground faults, false connection to the battery, and other abnormalities together with the alarm equipment (ALM). In addition, it detects when the battery feed current is too large (for example, when the distance to the subscriber is short) and suppresses the current and performs a wide variety of other functions.

In the battery feed current detection circuit, it is necessary to detect not only the forward direction current, but also the reverse direction current. This is because, as mentioned before, it is necessary to guarantee that the normal voice signal does not deteriorate in quality even if the in-phase signal current becomes larger than the battery feed current. Further, it is necessary to perform current detection in the forward and reverse directions even when considering performing reverse battery feed.

Figure 28:
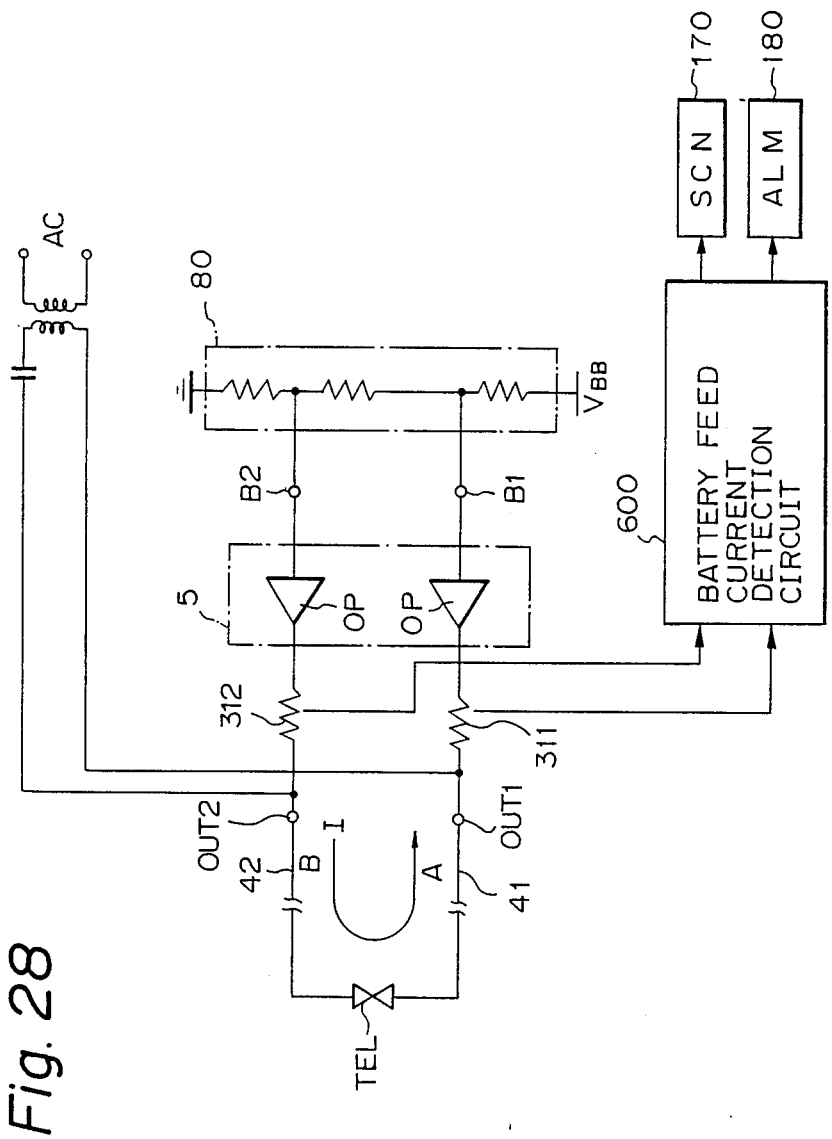
FIG. 28 is a view illustrating a general switching system.

FIG. 28 is a view illustrating a general switching system in which the main battery feed part 5 sends a battery feed current I to a subscriber telephone TEL via the line A 41 and the line B 42 from the battery feed terminals OUT1 and OUT2. The main battery feed part 5 includes an operational amplifier and, for its suitable operation, receives a bias voltage from a bias circuit 80 by the bias input terminals B1 and B2. Note that the in-put portion of the original voice signal AC is suitably selected. In the figure, the portion drawn as a DC blocking capacitor and a transformer connected to the terminals OUT1 and OUT2 is used as the input-output portion.

The battery feed current detection circuit according to the present invention is the block represented by the reference numeral 600 (corresponding to 320 in FIG. 21) and is provided at its input portion with detection resistors 311 and 312 through which the battery feed current I is passed. The detection circuit 600 performs various functions in cooperation with the detection current processing means etc. and drives, for example, the scanner 170, alarm equipment 180, etc.

This battery feed current detection circuit 600 was shown by reference numeral 320 in FIG. 21 and is realized by a forward and backward direction battery feed current detection circuit. The circuit 320 in FIG. 21, however, has as essential elements the operational amplifiers 322 and 323. However, in general, operational amplifiers require capacitors for internal compensation. The creation of capacitors on LSIs invites an increase in the chip area. Further, operational amplifiers have many transistors and other elements and the chip area thus further increases. Therefore, it would be ideal if a battery feed current detection circuit could be assembled without operational amplifiers.

Figure 29:
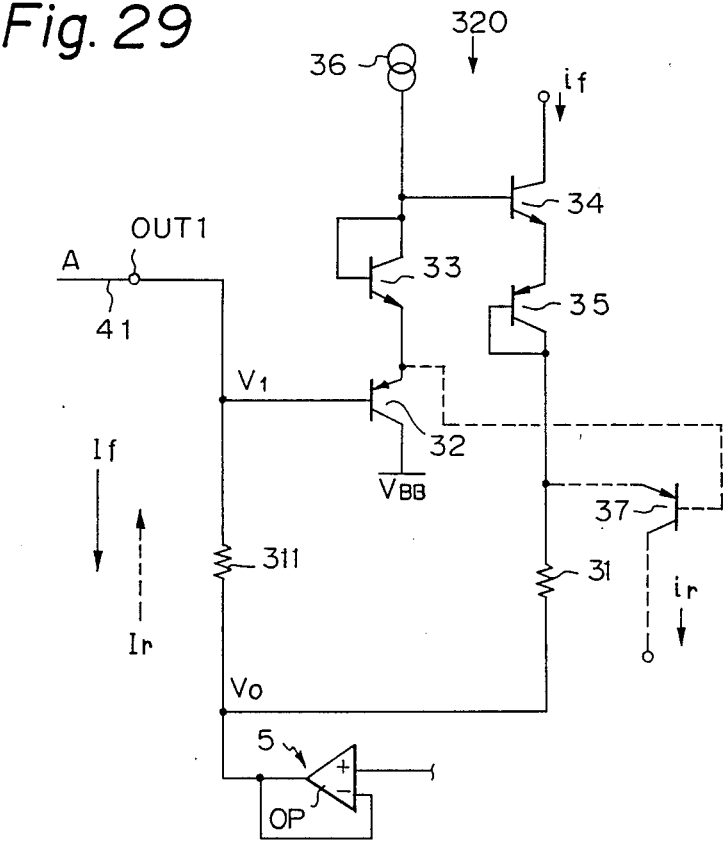
FIG. 29 is a view showing one example of a battery feed current detection circuit not using an operational amplifier.

FIG. 29 is a view showing one example of a battery feed current detection circuit not using an operational amplifier. In the figure, reference numerals 311, 41, 5, and 320 mean the same as mentioned earlier. When a forward direction battery feed current $I_f$ flows to the detection resistor 311, the voltages $V_0$ and $V_1$ appear at the two ends. One end of the resistor 311, as illustrated, is a low impedance end, i.e., is connected to the output of the operational amplifier OP forming the main battery feed part 5 (FIG. 28).

To the emitter of the PNP transistor 32 is connected in series the diode connected NPN transistor 33. Further, this is connected to a constant current source 36 for supplying a bias current. The collector of the PNP transistor 32 is connected to the minimum potential power source $V_{BB}$. By the flow of current to the PNP transistor 32, the base thereof monitors the voltage $V_1$ of the detection resistor 311 by high impedance. The voltage $V_1$ of the resistor 311 is added with the base-emitter voltages $V_{BE}$ of the transistors 32 and 33 and applied to the base of the NPN transistor 34. Here, if the $V_{BE}$s of the PNP transistors 32 and 35 are considered substantially equal and the $V_{BE}$s of the NPN transistors 33 and 34 are considered substantially equal, the voltage $V_1$ of the resistor 311 appears as it is at one end (right end in the figure) of the monitor resistor 31 and a forward direction detection current $i_f$ flows to the resistor 31. The magnitude of the same is:

$$i_f = (R_{311}/r_{31}) I_f$$

where, $R_{311}$ and $r_{31}$ are the resistance values of the resistors 311 and 31, respectively.

The battery feed current $I_f$ can be detected from this $i_f$.

In the circuit of FIG. 29, the voltage across the resistor 311 is normally a very small 1 V or less. Therefore, fluctuations in the base-emitter voltages $V_{BE}$ of the transistors cannot be ignored for detection accuracy. Note was taken of the fact that PNP type transistors generally exhibit uniform $V_{BE}$s and that NPN type transistors also exhibit generally uniform $V_{BE}$s so as to cancel the variance among transistors of the same conductivity type (PNP for PNP types and NPN for NPN types). The transistors for cancelling variance are transistors 33 (for cancelling 34) and 35 (for cancelling 32.). However, the introduction of these cancelling transistors itself is known from, for example, Japanese Unexamined Patent Publication (Kokai) No. 61-62268.

The battery feed current detection circuit shown in FIG. 29 can be assembled without operational amplifiers and thus achieve the desired object. However, in this circuit, it is only possible to detect the forward direction battery feed current $I_f$, so this cannot be applied to a circuit for both the forward and reverse directions.

Figure 30:
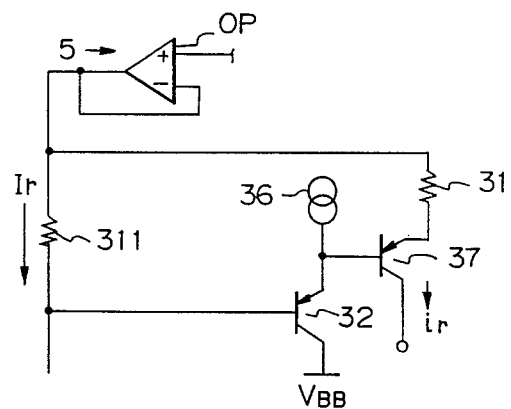
FIG. 30 is a view showing an equivalent circuit at the time of reverse direction detection.

Therefore, the assignee previously tried to add the wired PNP transistor 37 shown by the dotted line in FIG. 29 so as to obtain a reverse direction detection current $i_r$ corresponding to the reverse direction battery feed current $i_r$. FIG. 30 is a view showing an equivalent circuit at the time of reverse direction detection. This is the same as FIG. 29 but with the top and bottom reversed. Therefore, the operational amplifier OP of the main battery feed part 5 is placed at the top to make the direction of the battery feed current $I_r$ flowing through the detection resistor 311 match that of the $I_f$ of FIG. 29. The magnitude of the reverse direction battery feed current $I_r$ in this case is found by the reverse direction detection current $i_r$ from:

$$i_r = (I_r \times R_{311} - 2 V_{BE})/r_{31}$$

However, the numerator in the above formula has the nomial of 2 $V_{BE}$ (sum of the voltages $V_{BE}$ of the PNP transistors 32 and 37) left therein, so the circuit of +FIG. 30 cannot be used due to lack of precision.

In the end, there is the problem that the desired battery feed current detection circuit cannot be realized by just adding a reverse direction detection circuit system to the battery feed current detection circuit 20 shown in FIG. 29.

A fifth aspect of the present invention provides a battery feed current detection circuit which enables one to obtain, for both the forward and reverse directions, a high precision detection current by cancelling the variance in the $V_{BE}$s of the transistors and without use of any operational amplifiers.

Figure 31:
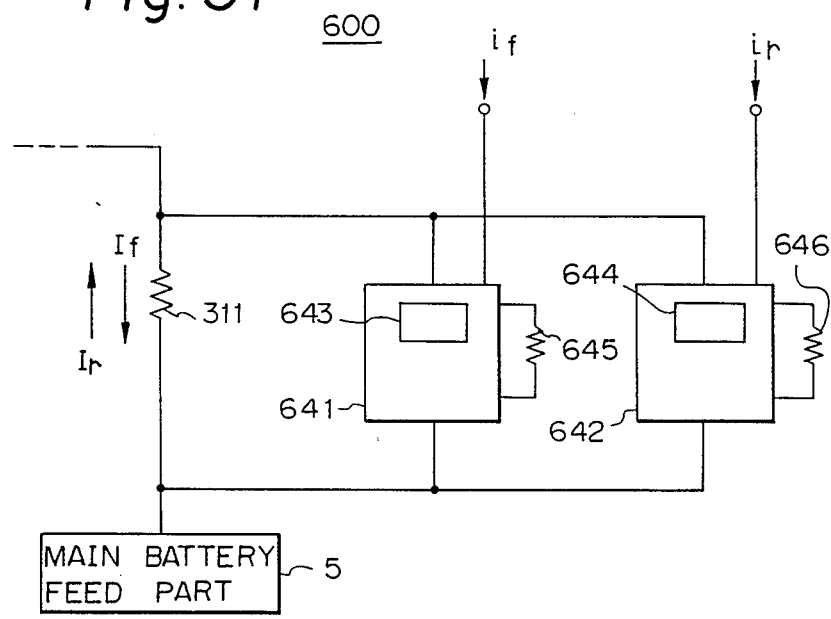
FIG. 31 is a view showing the principle and construction of the battery feed current detection circuit according to the present invention.

FIG. 31 is a view showing the principle and construction of the battery feed current detection circuit according to the present invention. The first detection means 641 monitors the voltage across the ends when a forward direction battery feed current $I_f$ flows to the detection resistor 311 and applies the result to the first monitor resistor 645. By this, a forward direction detection current $i_f$ is produced at the resistor 645. The first detection means 641 does not include any operational amplifiers at all and is comprised of an PNP transistor and NPN transistor. The internal first cancelling means 643 cancels the $V_{BE}$ of the transistors.

On the other hand, the second detection means 642 monitors the voltage across the ends when a reverse direction battery feed current $I_r$ flows to the detection resistor 311 and applies the result to the second monitor resistor 646. By this, a reverse direction detection current $i_r$ is produced at the resistor 646. The second detection means 642 does not include any operational amplifiers at all and is comprised of an PNP transistor and NPN transistor. The internal second cancelling means 644 cancels the $V_{BE}$ of the transistors.

In general, there is the preconception of sharing a monitor resistor for both the forward and reverse directions. As explained in reference to FIG. 29 and FIG. 30, means could not be introduced to cancel the $V_{BE}$ of the transistors in a system for detecting the reverse direction battery feed current $I_r$. The present invention provides two separate monitor resistors to handle both the forward direction and the reverse direction. These are the resistor 645 and resistor 646. As a result, a means for cancelling the $V_{BE}$ of the transistors can be easily assembled in the detection means, more particularly the second detection means 642.

Therefore, by just the simple assembly of NPN transistors and PNP transistors, it becomes possible to completely cancel the $V_{BE}$s of the transistors and detect the battery feed current in both the forward and reverse directions.

Figure 32:
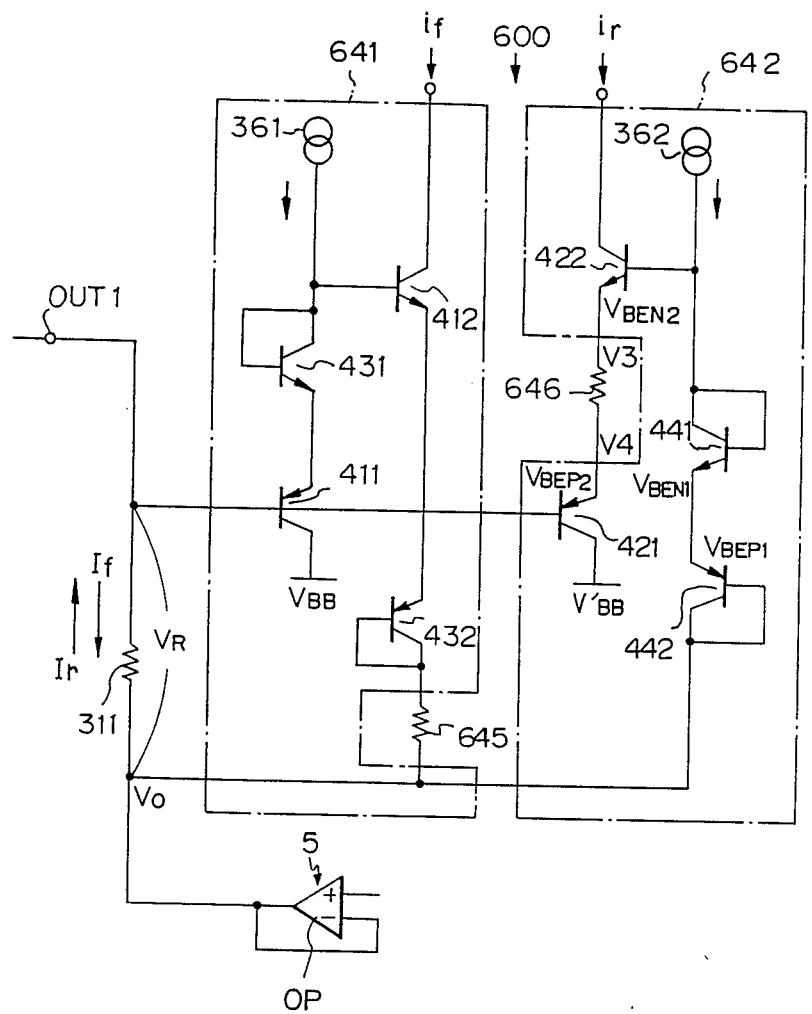
FIG. 32 is a view showing an embodiment of a batter feed current detection circuit according to the present invention.

FIG. 32 is a view showing an embodiment of a battery feed current detection circuit according to the present invention. In the figure, reference numerals 641 and 642 are the first detection means and second detection means shown in FIG. 31. A forward direction detection current $i_f$ and a reverse direction detection current $i_r$ are produced, respectively, when a forward direction battery feed current $I_f$ and a reverse direction battery feed current $I_r$ flow to the detection resistor 311. Therefore, the first detection means 641 monitors the voltage $V_r$ across the detection resistor 311 and applies this $V_R$ as is to the first monitor resistor 645. This construction includes the PNP transistor 411 and the NPN transistor 412 and, to cancel the $V_{BE}$s of the transistors, a first cancelling means 643, that is, an NPN transistor 431 connected in the form of a diode and a PNP transistor 432 connected in the form of a diode. The $V_{BE}$ of the transistor 411 is cancelled by the transistor 432, while the $V_{BE}$ of the transistor 412 is cancelled by the transistor 431. Reference numeral 361 is a constant current source for supplying bias current which supplies base current for the transistor 412, produces the $V_{BE}$ of the transistor 431, and places the transistor 411 in the operational state. The above construction resembles that of FIG. 29, but in the present invention a second detection means 642 is provided separately.

In the second detection means 642, the voltage $V_R$ across the detection resistor 311 is monitored and supplied as is to the second monitor resistor 646. This construction includes the PNP transistor 421 and the NPN transistor 422 and, to cancel the $V_{BE}$s of the transistors, a second cancelling means 644, that is, an NPN transistor 441 connected in the form of a diode and a PNP transistor 442 connected in the form of a diode. The $V_{BE}$ of the transistor 421 is cancelled by the transistor 442, while the $V_{BE}$ of the transistor 422 is cancelled by the transistor 441. Reference numeral 362 is a constant current source for supplying bias current which supplies base current for the transistor 422 and produces the $V_{BE}$ of the transistors 441 and 442.

In the second detection means 642, it is verified that the voltage $V_R$ across the detection resistor 311 (when $I_r$ is being passed) appears across the second monitor resistor 646. If the voltage across the resistor 646 is $V_3$ and $V_4$, then the following stand:

$$V_3 = V_0 + V_{BEP1} + V_{BEN1} - V_{BEN2} \quad (11)$$

$$V_4 = V_0 - V_R + V_{BEP2} \quad (12)$$

Here, $V_{BEP1}$ and $V_{BEP2}$ are the $V_{BE}$s of the PNP transistors 442 and 421, respectively, and $V_{BEN1}$ and $V_{BEN2}$ are the $V_{BE}$s of the NPN transistors 441 and 422, respectively, where $V_{BEP1} \approx V_{BEP2}$ and $V_{BEN1} \approx V_{BEN2}$.

Subtracting formula (12) from formula (11) (with a reverse direction battery feed current $I_r$ flowing and $V_3 > V_4$), the following stands:

$$V_3 - V_4 = V_{BEP1} + V_{BEN1} - V_{BEN2} + V_R - V_{BEP2} \quad (13)$$

Substituting into formula (13) the above $V_{BEN1} \approx V_{BEN2}$ and $V_{BEP1} \approx V_{BEP2}$, the following is obtained:

$$V_3 - V_4 = V_R$$

From this, it is understood that the voltage $V_R$ across the detection resistor 311 appears as it is across the second monitor resistor 646 ($V_3 - V_4$) without any interposition of $V_{BE}$.

As mentioned above, according to the present invention, it is possible to detect the forward direction and reverse direction battery feed current at a high precision without use of any operational amplifiers.

Finally, an explanation will be made of an overcurrent protection circuit, particularly an overcurrent protection circuit provided in a bidirectional battery feed circuit in a line circuit of a switching system.

The battery feed circuit naturally must be protected against the overcurrent flowing in the line A and the line B. Therefore, a function must be given of suppressing overcurrent while satisfying the previously mentioned conditions [1], [2], and [3]. Here, the overcurrent is produced at the time of ground fault accidents and false connection to a battery. In particular, there are often ground fault accidents at the line A side connected to the power source of −48 V.

Figure 33:
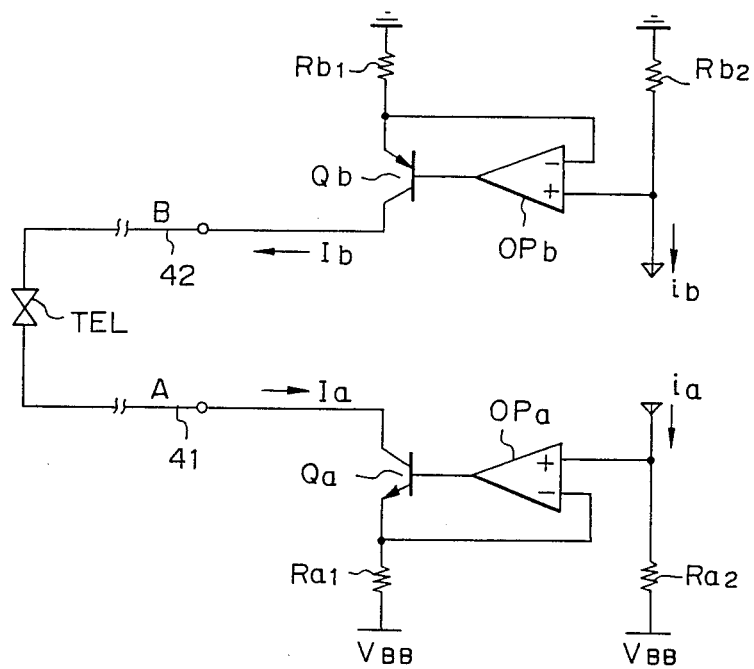
FIG. 33 is a view showing key portions of a known battery feed circuit.

FIG. 33 is a view showing key portions of a known battery feed circuit. This shows in more detail, for example, the main battery feed part 5 of FIG. 7. Therefore, the operation is substantially the same as the previously described operation. To facilitate the explanation, however, we will start from FIG. 33. The circuit is comprised by the line A side operational amplifier $OP_a$, the transistor $Q_a$, and the resistors $R_{a1}$ and $R_{a2}$ and the line B side operational amplifier $OP_b$, the transistor $Q_b$, and the resistors $R_{b1}$ and $R_{b2}$. The operation on the line A side and line B side are the same. Looking at the line A side, when the control current $i_a$ is passed, a voltage of $R_{a2} \times i_a$ is generated across the resistor $R_{a2}$. This voltage appears as it is across the resistor $R_{a1}$ by an imaginary short-circuit of the operational amplifier OP$_a$. As a result, a DC battery feed current I$_a$ [=(R$_{a2}$×i$_a$)/R$_{a1}$] flows to the subscriber telephone TEL.

The overcurrent protection is realized by making the voltage appearing across the resistor R$_{a1}$ smaller at the time of detection of an overcurrent. For this, the voltage appearing across the resistor R$_{a2}$ is made smaller. For example, a shunt resistor is provided in advance at the resistor R$_{a2}$ and, when an overcurrent is detected, is connected in parallel to the R$_{a2}$. Alternatively, the control current i$_a$ is adjusted to make i$_a$ smaller. Note that the circuit of FIG. 33 is disclosed in, for example, Japanese Unexamined Patent Publication (Kokai) No. 57-42263.

However, the battery feed disclosed in Japanese Unexamined Patent Publication (Kokai) No. 57-42263 satisfies the previously mentioned conditions [1], [2], and [3], but is unable to cope with the afore-mentioned recent trend of demands for preventing distortion in the voice signals even when the in-phase signal current becomes larger than the DC battery feed current. The reason why is that the battery feed disclosed in the publication is comprised of a PNP transistor with a collector connected to line B and an NPN transistor with a collector connected to the line A. The former PNP transistor can only send out DC current from its collector, and the latter NPN transistor can only absorb DC current from its collector, so reverse feed of DC current is not possible.

This problem may be eliminated by the use of a bidirectional battery feed circuit, preferably by the use of the bidirectional battery feed circuit shown in FIG. 2. When providing an overcurrent protection circuit for the battery feed circuit of FIG. 2, there is the problem that the overcurrent protection function explained in FIG. 33 cannot be applied as is. The reason for this is that the type of battery feed circuit shown in FIG. 2 and the type of battery feed circuit shown in FIG. 33 are completely different.

The final aspect of the present invention provides an overcurrent protection circuit suitable for a bidirectional battery feed circuit constructed using transconductance amplifiers.

Figure 34:
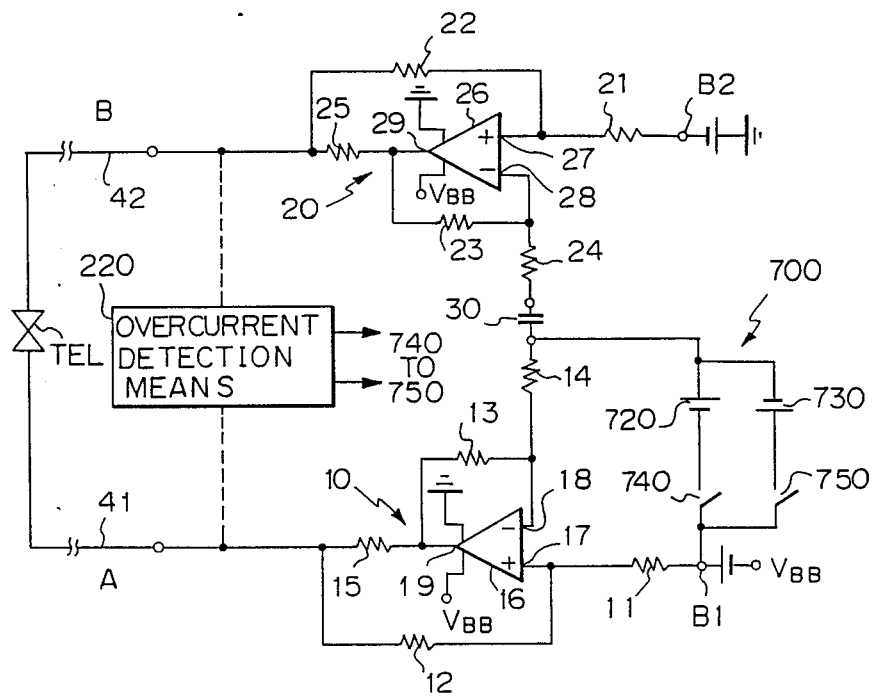
FIG. 34 is a view showing the principal and construction of an overcurrent protection circuit according to the present invention.
Figure 35:
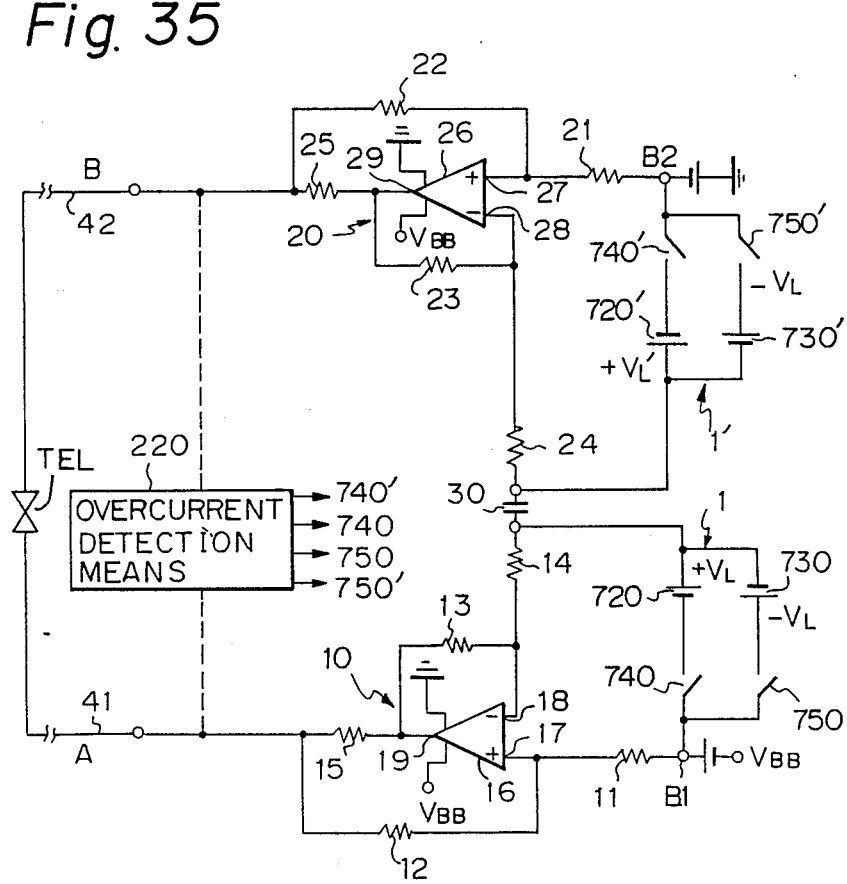
FIG. 35 is a view of the principle and structure showing an overcurrent protection circuit provided at the line B side as well.

FIG. 34 is a view showing the principal and construction of an overcurrent protection circuit according to the present invention. The circuit being protected from overcurrent, i.e., the battery feed circuit, is as shown in FIG. 2. The overcurrent protection circuit is shown by reference numeral 700 on the line A side. Note that a circuit the same as the overcurrent protection circuit 700 may be provided at a similar portion of the line B side to further increase the overcurrent protection effect. However, in principle, it is sufficient to provide one at just the line A side to obtain an overcurrent protection effect against ground faults. FIG. 35 is a view of the principle and structure showing an overcurrent protection circuit provided at the line B side as well. Portions corresponding to those in FIG. 34 are given the same reference numerals or symbols.

The overcurrent protection circuit 700 in FIG. 34 is comprised of voltage generating means 700 and 730 and switch means 740 and 750. As illustrated, these are connected in series as pairs of 720 and 740 and 730 and 750 between the noninverting input 17 and inverting input 18 of the operational amplifier. The voltage generating means 720 and 730 generate a predetermined set voltage. On the other hand, the switch means 740 and 750 are selectively controlled to be on and off by the overcurrent detection means 220.

The voltage generating means 720 and 730 are provided with double polarities so as, as mentioned before, to enable handling of cases where the in-phase signal current becomes larger than the DC battery feed current. Further, this is to enable handling of reverse battery feed for higher functions (reversing I$_a$ and I$_b$).

Figure 36:
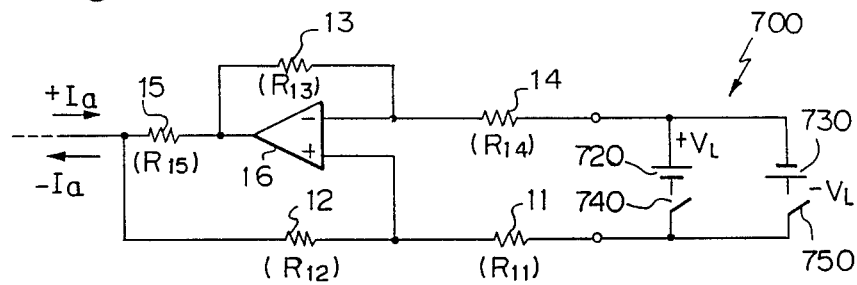
FIG. 36 is a view for explaining the principle of the operation of the present invention.

FIG. 36 is a view for explaining the principle of the operation of the present invention. By applying a predetermined constant voltage $+V_L$, the DC battery feed current $+I_a$ is restricted. Alternatively, by applying a predetermined constant voltage $-V_L$, $-I_a$ is restricted. When $+I_a$ is restricted, the switch means 740 is turned on and when the $-I_a$ is restricted, the switch means 750 is turned on. Which to turn on is determined by the overcurrent detection means 220. The overcurrent detection means 220 is shown in FIG. 15.

The magnitude I$_a$ of $+I_a$ or $-I_a$ is found by:

$$I_a = R_{12}/R_{11} \times V_L/R_{15}$$

The resistances are set so that $R_{12}=R_{13}$ and $R_{11}=R_{14}$. $R_{11}, R_{12} \ldots$ are resistance values of the resistors 11, 12, ... (shown in FIG. 2), and $V_L$ is the magnitude of the predetermined constant voltage (afore-mentioned $+V_L$, $-V_L$). Transconductance amplifiers are inherently provided with functions for converting voltage to current. If the voltage $V_L$ is suppressed to a certain constant value, the current I$_a$ corresponding to $V_L$ is suppressed to a certain constant value and an overcurrent suppression function is exhibited.

Figure 37:
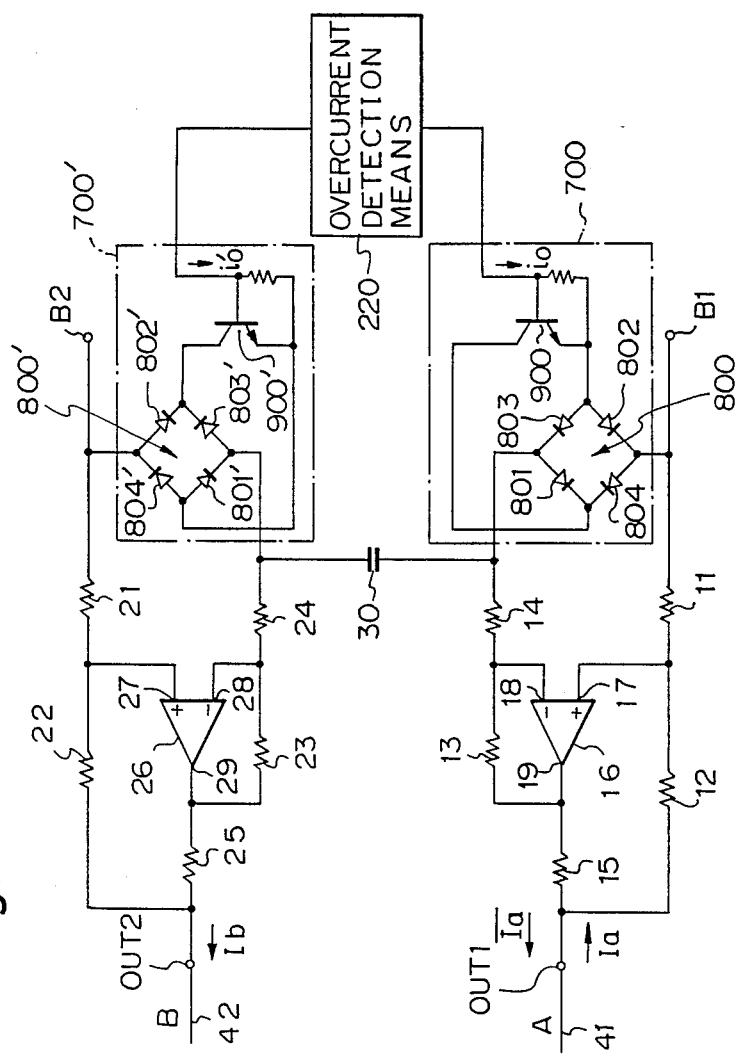
FIG. 37 is a circuit diagram showing an embodiment of the overcurrent protection circuit and a battery feed circuit according to the present invention.

FIG. 37 is a circuit diagram showing an embodiment of the overcurrent protection circuit and a battery feed circuit according to the present invention. As mentioned before, it is not necessary to have an overcurrent protection circuit at both the line A and line B side, but this embodiment shows an overcurrent protection circuit 700' at the line B side as well (FIG. 35). These circuits 700 and 700' are the same in circuit construction, so the explanation will be made for just the circuit 700.

The voltage generating means (720 and 730 in FIG. 34 and FIG. 35) forming the overcurrent protection circuit 700 is comprised of a diode bridge 800. The switch means (740 and 750 in FIG. 34 and FIG. 35) forming the same circuit 700 is comprised of a single transistor switch 900. At the sides of the diode bridge 800 are provided diodes, the forward voltage drop of the diodes (and the on voltage of the transistor 900) forms a predetermined constant voltage ($V_L$ in FIG. 36). Therefore, if $V_L$ is large, the diodes at the sides are connected in series in multiple stages.

By the introduction of the diode bridge 800, the following two advantages are obtained: The first advantage is that the two switch means 740 and 750 of FIG. 34 are replaced by a single transistor switch 900. This is based on the full-wave rectifying action of the diode bridge.

The second advantage is that whether the direction of the overcurrent I$_a$ is forward or reverse, it can be handled by the single diode bridge 800. The diode bridge performs automatic inversion of the current direction. As a result, the switch means can be the single transistor switch 900, i.e., there is no need to provide a separate forward direction switch means 740 and reverse direction switch means 750 as shown in FIG. 34 and FIG. 35). Further, looking at this from the standpoint of the overcurrent detection means 640, no matter what the direction of the flow of the overcurrent, of an overcurrent flows, it is sufficient to pass the detection current $i_o$, so the trouble of differentiating and outputting on-off control currents to the switch means 740 and the switch means 750 as in FIG. 34 and FIG. 35 is eliminated.

If the detection current $i_o$ flows and the overcurrent $I_a$ flows, the major portion of $I_a$ passes through the resistors 12 and 11 to flow to the bias input terminal B1 and through the resistor 15 to flow to the operational amplifier 16, but the current which passes through the resistors 15, 13 and 14 passes through the diode 801, the transistor switch 900 (which is turned on by the $i_o$), and the diode 802 to reach B1. Here, the sum of the forward direction voltage drop ($2\,V_F$) of the diodes 801 and 802 and the collector-emitter saturation voltage ($V_{CEsat}$) of the transistor switch 900 forms the previously mentioned constant voltage $V_L$.

Conversely, if the detection current $i_o$ flows and the overcurrent $\overline{I_a}$ flows, the major portion of $\overline{I_a}$ passes through the resistors 12 and 11 to flow to the battery feed terminal OUT1 and flows out from the operational amplifier 16, but the current which passes through the resistors 14 and 13 passes from B1 through the diode 804, the transistor switch 900 (which is turned on by the $i_o$), and the diode 803 to reach OUT1. Here, the sum of the forward direction voltage drop ($2\,V_F$) of the diodes 804 and 803 and the collector-emitter saturation voltage ($V_{CEsat}$) of the transistor switch 900 forms the previously mentioned constant voltage $V_L$. Therefore, The battery feed circuit $I_a$ or $\overline{I_a}$ restricted by $V_L$ flows and it is possible to protect the battery feed circuit from overcurrent.

As mentioned above, according to the present invention, an overcurrent protection circuit is realized which is suitable for a bidirectional battery feed circuit of a type where pairs of transconductance amplifiers are coupled by capacitors.

The main battery feed part and the group of its peripheral circuits explained above do not exist independently, but in practice are assembled into a single unit to form a single battery feed circuit.

Figure 38A:
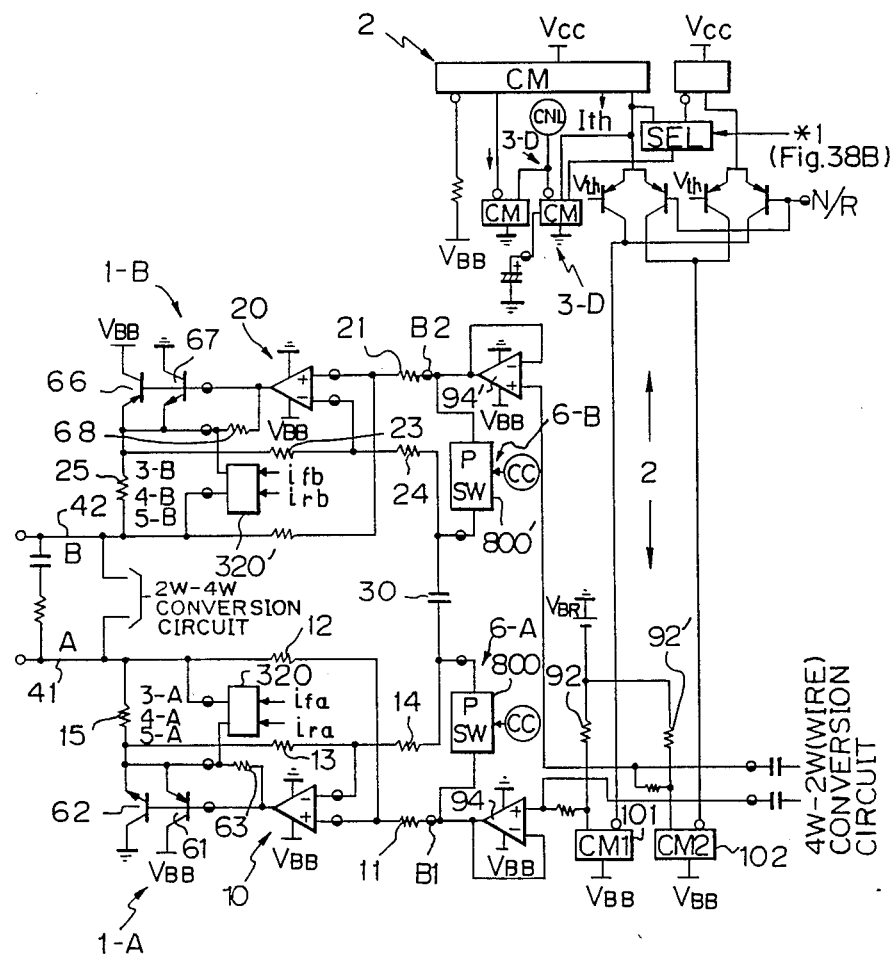
FIG. 38A and FIG. 38B are views showing an example of a battery feed circuit system according to the present invention.
Figure 38:
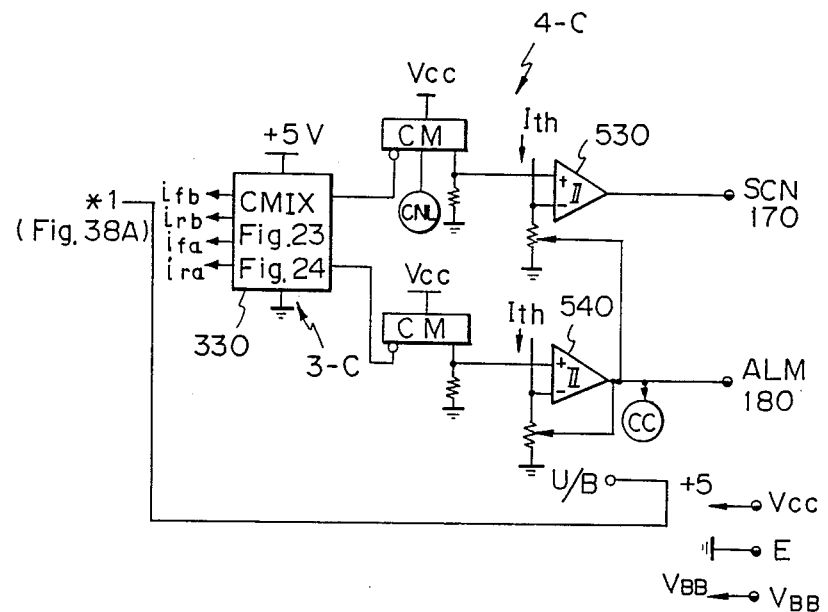

FIG. 38A and FIG. 38B are views showing an example of a battery feed circuit system according to the present invention. Note that the same reference numerals or symbols are given for elements equivalent to those mentioned earlier. In FIG. 38A and 38B, 1-A and 1-B correspond to parts of the battery feed circuit portion shown in FIG. 2, 2 corresponds to part of the bias circuit portion shown in FIG. 11, 3-A, 3-B, 3-C, and 3-D correspond to parts of the battery feed current control circuit shown in FIG. 17, 4-A and 4-B correspond to the battery feed current supervising circuit shown in FIG. 22, 5-A and 5-B correspond to the battery feed current detection circuit shown in FIG. 31, 6-A and 6-B correspond to part of the overcurrent protection circuit shown in FIG. 37. In FIG. 38A and FIG. 38B, CM means a current mirror circuit, and SEL a selector. Note that 3-B, 4-B, and 5-B are common portions in a single battery feed circuit, as are 3-A, 4-A, and 5-A.

As explained in detail above, according to the present invention, a bidirectional battery feed circuit is realized by a structure suited for practical application.

We claim:

1. A battery feed system for feeding a DC battery current through first and second subscriber lines to a subscriber telephone, comprising:

first transconductance amplifier means, having a first bias input terminal, a first control input terminal and a first battery feed terminal and including a first operational amplifier operatively connectable to a first subscriber line and operatively connected to the first battery feed terminal, for providing the DC current to one of said first and second subscriber lines;

second transconductance amplifier means having a second bias input terminal, a second control input terminal and a second battery feed terminal and including a second operational amplifier operatively connectable to a second subscriber line and operatively connected to the second battery feed terminal, for providing the DC current to a remaining one of said first and second subscriber lines; and capacitor means, operatively connected between the first and second control input terminals, for providing a low impedance for in-phase signals, applied to said first and second transconductance amplifier means and for providing a high impedance for differential signals applied to said first and second transconductance amplifier means.

2. A battery feed system according to claim 1, further comprising:

bias circuit means for supplying a bias voltage to said first and second bias input terminals;

said bias circuit comprising:

bias voltage generating means, having an output with high output impedance, for generating a bias voltage;

low output impedance buffer means for receiving the bias voltage and for supplying the bias voltage to said first and second bias input terminals;

AC bypass capacitor means, operatively connected between the output of said bias voltage generating means and the earth for filtering the output of said bias voltage generating means.

3. A battery feed system according to claim 2, wherein said bias voltage generating means comprises: a first current source operatively connectable to a power source $V_{BB}$ and operatively connected to the output of said bias voltage generating means;

a first resistor having an end operatively connected to a reference voltage source $V_{BR}$ and another end operatively connectable to said output of said bias voltage generating means;

a second current source operatively connectable to the power source $V_{BB}$ and operatively connected to the output of said bias voltage generating means; and a second resistor having an end operatively connectable to the reference voltage source $V_{BR}$ and another end operatively connected to said output of said bias voltage generating means.

4. A battery feed system according to claim 3, further comprising:

first buffer means, having a first input, for buffering a signal applied to the first input of said first buffer means;

second buffer means, having a first input, for buffering a signal applied to the first input of said second buffer means; and current switching means for selectively providing a reference current, and wherein said first and second current sources respectively comprise first and second current mirror circuits, each having an output operatively connected to a corresponding first input of said first and second buffer means, and having an input operatively connected to receive said reference current, and wherein said AC bypass capacitor means comprises first and second AC bypass capacitors respectively connected between corresponding ones of said first and second current mirror circuits and an earth potential.

5. A battery feed system according to claim 4 wherein said bias voltage generating means comprises:

reference current generating means for producing said reference current approximately equal in value to a bias current to be passed through said first and second resistors.

6. A battery feed system according to claim 5, wherein said reference current generating means comprises:

a third current mirror circuit operatively connected to said current switching means through one terminal;

a third resistor connected in series between said third current mirror circuit and said power source $V_{BB}$; and a transistor having a base operatively connectable to said earth potential.

7. A battery feed system according to claim 6, wherein said current switching means comprises a current switch including a pair of transistors operatively connected to said first and second current mirror circuits.

8. A battery feed system according to claim 4, wherein said first and second buffer means respectively comprise first and second voltage follower circuits.

9. A battery feed system according to claim 1, further comprising:

bias circuit means for supplying bias voltage $V_{B1}$, $V_{B2}$ to said first and second bias input terminals;

battery feed current control means for controlling and supplying a battery feed current (I) to said first and second battery feed terminals in response to said bias voltage, p1 said battery feed current control means comprising:

battery feed current detection means for detecting the magnitude of said battery feed current I, overcurrent detection means for detecting an overcurrent component $\Delta I$ when the detected battery feed current I rises above a predetermined set value $I_{th}$, and bias voltage control means for changing said bias voltage $V_{B1}$, $V_{B2}$ in accordance with the said detected overcurrent component $\Delta I$ such that increases in said battery feed current I are smaller as said overcurrent component $\Delta I$ increases.

10. A battery feed system according to claim 9, wherein said battery feed current detection means includes:

means for providing a detection current proportional to said battery feed current I detected by said battery feed current detection means, and wherein said overcurrent detection means comprises:

a first current mirror circuit operatively connected to receive at a first terminal said detection current and to provide at a second terminal a current proportional to said detection current, and constant current means, operatively connected to the second terminal, for providing a constant current $i_{th}$ proportional to a predetermined value $I_{th}$ of said battery feed current and wherein a difference between the said detection current produced at said second terminal and said constant current $i_{th}$ is proportional to an overcurrent $\Delta i$ corresponding to said overcurrent component $\Delta I$.

11. A battery feed system according to claim 10, wherein said bias voltage control means comprises:

a second current mirror circuit operatively connected to receive, at a first terminal, an overcurrent $\Delta i$ corresponding to the overcurrent component $\Delta I$ detected by said overcurrent detection means, and operatively connected to receive, at a second terminal, a control current equal in value to said overcurrent $\Delta i$, and operatively connected to receive, at a third terminal, a current equal in value to said control current; and a third current mirror circuit operatively connected to provide, at a first terminal, a current to said third terminal, and operatively connected to provide, at a second terminal, a current equal in value to said current applied to said third terminal so as to change said bias voltage $V_{B2}$ or $V_{B1}$.

12. A battery feed system according to claim 11, wherein said bias voltage control means further comprises:

first and second transistors connected as a common emitter current switch, said first transistor operatively connected to the first terminal of said third current mirror circuit and to the third terminal of said second current mirror circuit, and said second transistor operatively connected to the third terminal of said second current mirror circuit so as to provide the current equal in value to said control current $i_c$ received at the second terminal of said second current mirror circuit.

13. A battery feed circuit according to claim 11, wherein said first and second transistors are operatively connected to the second terminal of said third current mirror circuit and wherein said battery feed current control circuit further comprises means for selecting the bias voltage to be either of a bias voltage $V_{B2}$ or a bias voltage $V_{B1}$.

14. A battery feed system according to claim 1, further comprising a battery feed current supervising circuit that includes:

first and second battery feed current detection means for respectively detecting battery feed currents through said subscriber lines;

detection current processing means for processing and supervising a detection current detected by said first and second battery feed current detection means.

15. A battery feed system according to claim 14, wherein said detection current processing means is operatively connected to receive four detection currents, a forward direction detection current and reverse direction detection current on one of said subscriber lines, and a forward direction detection current and a reverse direction detection current on another one of said subscriber lines, and wherein said detection current processing means comprises:

addition-subtraction means for adding and subtracting predetermined combinations of said four detection currents, and uses the results of this addition and subtraction for the above supervision.

16. A battery feed system according to claim 15, wherein said addition-subtraction means comprises:

a plurality of current mirror circuits connected so as to add a predetermined two of said four detection currents and to subtract on another predetermined two of said four detection currents.

17. A battery feed system according to claim 16, wherein said detection current processing means further comprises:
first and second absolute value means, operatively connected to said addition-subtraction means, for providing signals corresponding to an absolute value of signals added and subtracted by said addition-subtraction means and for performing said supervision by detecting when the output of said absolute values exceeds a predetermined set value.

18. A battery feed system according to claim 1, further comprising:
battery feed current detection detecting means for detecting the battery feed current, battery feed current detection means comprises:
a detection resistor operatively connectable to receive the battery feed current;
first detection means for detecting the battery feed current;
second detection means for detecting the battery feed current.

19. A battery feed system according to claim 18, wherein said first detection means comprises:
a first NPN transistor, and
a first PNP transistor, and wherein said second detection means comprises:
a second NPN transistor, and
a second PNP transistor,
said first and second PNP transistors have commonly connected bases and being operatively connected to said detection resistor.

20. A battery feed system according to claim 19, wherein said first NPN transistor and said second NPN transistor are operatively connected to receive a forward direction detection current $i_f$ and a reverse direction detection current $i_r$.

21. A battery feed system according to claim 20, wherein said first detection means includes first cancelling means for cancelling the base-emitter voltage of said NPN and said PNP transistors, said first cancelling means comprising:
a third NPN transistor operatively connected as a diode,
a third PNP transistor operatively connected as a diode, and
a first constant current source means for supplying a bias current which supplies a base current to said first NPN transistor and generates a base-emitter voltage of said third PNP transistor, and wherein said second detection means includes second cancelling means for cancelling the base-emitter voltage of said NPN and said PNP transistors, said first cancelling means comprising:
a fourth NPN transistor connected as a diode, a fourth PNP transistor connected in series with said fourth NPN transistor, and
a second constant current source means for supplying a bias current which, for supplying a base current to said second NPN transistor and for generating a base-emitter voltage of said fourth NPN and PNP transistors,
said series-connected fourth NPN and fourth PNP transistors being operatively connected to the base of said second NPN transistor and to said detection resistor.

22. A battery feed system according to claim 1, further comprising:
overcurrent detection means for detecting excessive battery feed current;
overcurrent protection means for protecting against excessive battery feed current by said overcurrent detection means, said overcurrent protection circuit comprising:
first and second voltage generating means, operatively connected in series across inputs of said first operational amplifier, for generating a predetermined constant voltage $V_L$; and
first and second switch means for selectively connecting said first and second voltage generating means to said first operational amplifier based upon said detection by said overcurrent detection means.

23. A battery feed system according to claim 22, wherein said first and second voltage generating means each comprises a diode bridge, wherein
said first and second switch means each comprise a transistor switch operatively connected to pass a current rectified by corresponding ones of said diode bridges, and
said transistor switches being switched based upon said deletion by said overcurrent detection means.

24. A battery feed system according to claim 22, wherein said overcurrent protection means comprises:
third and fourth voltage generating means, operatively connected in series across inputs of said second operational amplifier, for generating the predetermined constant voltage $V_L$; and
third and fourth switch means for selective connecting said third and fourth voltage generating means to said second operational amplifier based upon said detection by said overcurrent detection means.

25. A battery feed system according to claim 24, wherein said third and fourth voltage generating means each comprise a diode bridge, wherein
said third and fourth switch means each comprise a transistor switch operatively connected to pass a current rectified by corresponding ones of said diode bridges, and
said transistor switches being switched based upon said deletion said overcurrent detection means.

26. A battery feed system according to claim 1, wherein each of said first and second transconductance amplifiers means comprises:
(1) a first resistor operatively connected between the corresponding bias input terminals and an input of the corresponding operational amplifier;
(2) a second resistor operatively connected between the battery feed terminal and the input of the corresponding operational amplifier;
(3) a third resistor operatively connected between the output of and another input of the corresponding operational amplifier;
(4) a fourth resistor operatively connected between the corresponding control input terminal and another input of the corresponding operational amplifier, and;
(5) a fifth resistor operatively connected between the corresponding battery feed terminal and the output.

27. A battery feed system according to claim 14, further comprising:
a detection resistor operatively connectable to receive the battery feed current; and a voltage/current converting resistor, and wherein each of said first and second battery feed current detection means comprises:

first operational amplifier and second operational amplifiers having inverting inputs, and having non-inverting inputs operatively connected across said detection resistor through which said battery feed current is passed; and first and second emitter follower circuits having emitter-coupled NPN transistors and PNP transistors and with bases operatively connected to the outputs of said first and second operational amplifiers, the emitter-coupled transistors being operatively connected to the inverting inputs of said first and second operational amplifiers and said voltage/current converting resistor, and a current which flows through said first and second emitter-coupled transistors corresponds to said detection current.

28. A battery feed system according to claim 18, wherein said first detection means comprises:

a NPN transistor, a PNP transistor, first cancelling means for cancelling the base-emitter voltages of said NPN and PNP transistors, a first monitor resistor of said first detection means for monitoring a voltage across said detecting means in response to a forward direction battery feed current $I_f$ is being passed, and for applying a current $I_f$, and wherein said first monitor resistor so as to produce a forward direction detection current $i_f$, and wherein said second detection means comprises:

a NPN transistor, a PNP transistor, second cancelling means for cancelling the base-emitter voltages of said NPN and PNP transistors of said second detection means, a second monitor resistor, and means for monitoring a voltage across said detecting means in response to a reverse direction battery fed current $I_r$ is being passed, and for applying current $I_r$ to said second monitor resistor so as to produce a reverse direction detection current $i_r$.

* * * * *

UNITED STATES PATENT AND TRADEMARK OFFICE
CERTIFICATE OF CORRECTION

PATENT NO. : 4,935,960
DATED : June 19, 1990
INVENTOR(S) : Kenji Takato et al.

It is certified that error appears in the above-identified patent and that said Letters Patent is hereby corrected as shown below:

On the title page:

[75] "Yuzo Yamamoto" should be --Yūzō Yamamoto--.
    [63] "June 16, 1989" should be --June 16, 1988--.

Signed and Sealed this

Thirty-first Day of March, 1992

Attest:

HARRY F. MANBECK, JR.

*Attesting Officer*  *Commissioner of Patents and Trademarks*